United States Patent
Fritzsche et al.

(10) Patent No.: US 8,468,781 B2
(45) Date of Patent: Jun. 25, 2013

(54) STACKING APPARATUS AND METHOD OF MULTI-LAYER STACKING OF OBJECTS ON A SUPPORT

(75) Inventors: Roland Fritzsche, Nürnberg (DE); Martin Dirks, Northeim (DE); Lorne A. Weeter, Springboro, OH (US); Steven D. McArthur, Sterling Heights, MI (US)

(73) Assignee: Dematic Corp., Grand Rapids, MI (US)

( * ) Notice: Subject to any disclaimer, the term of this patent is extended or adjusted under 35 U.S.C. 154(b) by 546 days.

(21) Appl. No.: 12/622,713

(22) Filed: Nov. 20, 2009

(65) Prior Publication Data
US 2010/0146907 A1    Jun. 17, 2010

Related U.S. Application Data

(60) Provisional application No. 61/116,889, filed on Nov. 21, 2008.

(51) Int. Cl.
| | | |
|---|---|---|
| B65B 35/50 | (2006.01) | |
| B65G 57/06 | (2006.01) | |
| B65G 57/03 | (2006.01) | |

(52) U.S. Cl.
USPC ......... 53/447; 53/540; 414/791.6; 414/792.7; 414/799; 414/802

(58) Field of Classification Search
USPC .................. 53/523, 529, 537, 540, 556, 587, 53/441, 447; 414/791.6, 792.6, 792.7, 793.4, 414/794.3, 799, 802
See application file for complete search history.

(56) References Cited

U.S. PATENT DOCUMENTS

| | | | | |
|---|---|---|---|---|
| 3,529,732 A | * | 9/1970 | Wayne | ........................ 414/793.5 |
| 3,612,300 A | | 10/1971 | Berghgracht | |

(Continued)

FOREIGN PATENT DOCUMENTS

| | | |
|---|---|---|
| DE | 2708160 A1 | 9/1978 |
| DE | 3347474 A1 | 2/1985 |

(Continued)

OTHER PUBLICATIONS

English language abstract for German Patent No. DE 3906922.

(Continued)

*Primary Examiner* — Stephen F Gerrity
(74) *Attorney, Agent, or Firm* — Gardner, Linn, Burkhart & Flory, LLP

(57) ABSTRACT

A stacking apparatus and method of multi-layer stacking of objects of different sizes on a support to form a stacked support includes providing a support handler. A support is elevated with the support handler and objects of different sizes and shapes are stacked on the support to form a stacked support. A stacked support is removed and an empty support supplied with the support handler. A placeholder is provided above the support handler. The placeholder has a first mode for receiving objects on the placeholder. The placeholder has a second mode for providing access to a support on the support handler. The placeholder is put in the first mode while the support handler removes a stacked support and supplies an empty support. The placeholder is put in the second mode when the support handler is elevating a support being stacked with articles. Objects that have been received on the placeholder during the first mode are deposited from the placeholder to the support when changing the placeholder from the first mode to the second mode.

41 Claims, 20 Drawing Sheets

U.S. PATENT DOCUMENTS

| | | | |
|---|---|---|---|
| 3,986,621 A | | 10/1976 | Bowser |
| 4,132,318 A | * | 1/1979 | Wang et al. .................. 414/591 |
| 4,205,934 A | * | 6/1980 | Pantin et al. ............... 414/793.5 |
| 4,214,848 A | | 7/1980 | Verwey et al. |
| 4,271,755 A | | 6/1981 | Kintgen et al. |
| 4,593,517 A | * | 6/1986 | Mattila ........................... 53/441 |
| 4,708,564 A | | 11/1987 | Mylrea et al. |
| 5,005,335 A | * | 4/1991 | Yourgalite et al. .............. 53/399 |
| 5,051,058 A | | 9/1991 | Roth |
| 5,087,169 A | * | 2/1992 | Tubke ......................... 414/792.9 |
| 5,098,254 A | * | 3/1992 | Becicka et al. ............. 414/792.9 |
| 5,169,284 A | * | 12/1992 | Berger et al. .............. 414/796.9 |
| 5,193,973 A | * | 3/1993 | Tubke ......................... 414/796.9 |
| 5,348,440 A | * | 9/1994 | Focke ......................... 414/792.9 |
| 5,372,472 A | * | 12/1994 | Winski et al. .................. 414/802 |
| 5,540,545 A | * | 7/1996 | Roberts et al. ............. 414/792.6 |
| 5,607,282 A | | 3/1997 | Brannen et al. |
| 5,623,808 A | | 4/1997 | Franklin et al. |
| 5,701,722 A | * | 12/1997 | Franklin et al. ................. 53/399 |
| 5,738,484 A | * | 4/1998 | Taylor ........................ 414/788.1 |
| 5,758,471 A | * | 6/1998 | Denley et al. ................... 53/399 |
| 5,873,214 A | * | 2/1999 | Moore et al. .................... 53/399 |
| 5,893,258 A | * | 4/1999 | Lancaster, III ................. 53/399 |
| 6,164,900 A | | 12/2000 | Labell et al. |
| 6,533,533 B1 | * | 3/2003 | Heston ....................... 414/791.6 |
| 6,594,970 B1 | * | 7/2003 | Hyne et al. ...................... 53/399 |
| 6,602,037 B2 | | 8/2003 | Winkler |
| 6,678,582 B2 | | 1/2004 | Waled |
| 6,817,824 B2 | | 11/2004 | Winkler |
| 6,880,311 B2 | | 4/2005 | Winkler |
| 6,915,904 B2 | | 7/2005 | Winkler |
| 7,047,710 B2 | | 5/2006 | Winkler |
| 7,097,045 B2 | | 8/2006 | Winkler |
| 7,153,085 B2 | | 12/2006 | Clark et al. |
| 7,244,093 B2 | | 7/2007 | Watanabe et al. |
| 7,266,422 B1 | | 9/2007 | DeMotte et al. |
| 7,296,834 B2 | | 11/2007 | Clark et al. |
| 7,309,203 B2 | | 12/2007 | Clark et al. |
| 8,074,431 B1 | * | 12/2011 | Pierson et al. .................. 53/529 |
| 2005/0166552 A1 | | 8/2005 | Omo et al. |
| 2006/0120850 A1 | | 6/2006 | Clark et al. |
| 2006/0182545 A1 | | 8/2006 | Ray et al. |
| 2008/0025832 A1 | | 1/2008 | Pierson et al. |
| 2008/0095601 A1 | * | 4/2008 | Yohe et al. ..................... 414/788 |
| 2009/0087295 A1 | | 4/2009 | Fritzsche |
| 2009/0138121 A1 | | 5/2009 | Wicks et al. |

FOREIGN PATENT DOCUMENTS

| | | |
|---|---|---|
| DE | 3906922 A1 | 10/1989 |
| DE | 4114215 A1 | 11/1992 |
| DE | 4338801 A1 | 5/1995 |
| EP | 0498263 A1 | 8/1992 |
| EP | 0511529 A1 | 11/1992 |
| EP | 1550610 A1 | 7/2005 |
| EP | 2103556 B1 | 8/2011 |
| FR | 2899203 A1 | 10/2007 |

OTHER PUBLICATIONS

English language abstract for German Patent No. DE 4338801.
English language abstract for German Patent No. DE 3347474.
International Search Report and Written Opinion of the International Searching Authority from corresponding Patent Cooperation Treaty (PCT) Application No. PCT/US2009/065291, mailed Jan. 26, 2010.
Commonly assigned co-pending U.S. Appl. No. 12/294,495, filed Mar. 13, 2008.
English language abstract for German Patent No. DE 4114215.
Machine translation of DE 2708160 generated by the European Patent Office website.
International Preliminary Report on Patentability from corresponding Patent Cooperation Treaty Patent Application No. PCT/US2009/065291 mailed Jun. 3, 2011.
European Search Report from corresponding European Patent Application No. 09828280, dated Feb. 8, 2013, 3 pages.

* cited by examiner

STACKING APPARATUS AND METHOD OF MULTI-LAYER STACKING OF OBJECTS ON A SUPPORT

CROSS REFERENCE TO RELATED APPLICATION

This application claims priority from U.S. provisional patent application Ser. No. 61/116,889, filed on Nov. 21, 2008, the disclosure of which is hereby incorporated herein by reference in its entirety.

BACKGROUND OF THE INVENTION

The present invention is directed to a palletizing apparatus and method and, in particular, to a stacking apparatus and method for multi-layer stacking of objects on a support. The invention is particularly adapted to stacking objects on a support with the objects having different dimensions in order to form a stacked support. Such apparatus and method are generally referred to as "mixed-case" palletizing.

In mixed-case palletizing, different considerations must be taken into account which increase the complexity compared with stacking of uniformly dimensioned objects. An object to be stacked can only be stacked or placed on previous or preceding objects that are capable of supporting the object and the stack should be sufficiently stable so that it does not fall over during stacking or transportation.

SUMMARY OF THE INVENTION

A stacking apparatus and method of multi-layer stacking of objects of different sizes on a support to form a stacked support, according to an aspect of the invention, includes providing a support handler. A support is elevated with the support handler and objects are stacked on the support to form a stacked support. A stacked support is removed and an empty support supplied with the support handler. A placeholder is provided above the support handler. The placeholder has a first mode for receiving objects on the placeholder. The placeholder has a second mode for providing access to a support on the support handler. The placeholder is put in the first mode while the support handler removes a stacked support and supplies an empty support. The placeholder is put in the second mode when the support handler is elevating a support being stacked with articles. Objects that have been received on the placeholder during the first mode are deposited from the placeholder to the support when changing the placeholder from the first mode to the second mode.

The placeholder may be used with an opening generally aligned with the support handler and include at least one support surface. The support surface(s) generally cover the opening in the first mode and expose the opening in the second mode. If at least two support surfaces are provided, the support surfaces move away from each other as the placeholder changes from the first mode to the second mode.

The placeholder may include at least one stop. The stop(s) restrain objects stacked on the support surface(s) as the placeholder changes from the first mode to the second mode. Each stop may include a restraining surface that is positioned generally aligned with the support surface(s) when the placeholder is in the first mode and positioned above the support surface(s) when the placeholder changes from the first mode to the second mode. The stop may rotate the restraining surface between the position generally aligned with the support surface(s) and the position above the at least one support surface(s).

A load stabilization system may be provided for stabilizing a stacked support while it is being stacked with objects. The load stabilization system may include at least two opposing transition plates at the opening. An actuator may be provided for moving the transition plates toward each other while the support handler is maintaining a stacked support stationary and away from each other while the support handler is moving a stacked support. The load stabilization system may include two pairs of opposing transition plates defining a quadrilateral perimeter at the opening. The load stabilization system may also, or alternatively, include an integrated wrapping unit that is operable to wrap the stacked support with a film or web. The wrapping unit may wrap the stack as the support handler indexes a stack being formed.

The support handler may index a support unidirectionally downwardly while that support is being stacked with articles. The support handler may include an inlet for receiving empty supports and a discharge for discharging stacked supports. The inlet and discharge may be at opposite sides of the support handler. The support handler may include a lift for indexing a support being stacked with objects and an alignment device for aligning empty supports with the lift.

A handling device may be provided to grasp objects and a travel unit provided to manipulate the handling device. The handling device and the travel unit may be operable to displace objects to respective spatial positions to form a stacked support. An object feed may be provided to supply objects to the handling device. Two or more handling devices and associated travel units may be provided for displacing objects to respective spatial positions to form a common stacked support.

A stacking apparatus and method of multi-layer stacking of objects on a support in a particular spatial arrangement to form a stacked support, according to an aspect of the invention, includes providing a control that is operable to determine a particular order and spatial positions of the objects to be stacked on the support. A handling device is provided to grasp objects and a travel unit is provided to manipulate the handling device. The handling device and the travel unit are responsive to the control to displace objects to respective spatial positions to form a stacked support. A support handler is provided to remove stacked supports and supply empty supports. A placeholder is provided. The placeholder receives objects displaced by the handling device while said support handler removes a stacked support and supplies an empty support.

A bunching device may be provided for bunching objects prior to grasping with the handling device. An orienting device may be provided for reorienting objects about a horizontal axis prior to grasping with the handling device. A checking device may be provided for checking actual dimensions of objects against listed dimensions for those objects. An object-bunching unit may be provided that is operable to bunch objects presented to the handling device.

These and other objects, advantages and features of this invention will become apparent upon review of the following specification in conjunction with the drawings.

DESCRIPTION OF THE PREFERRED EMBODIMENT

Figure 1:
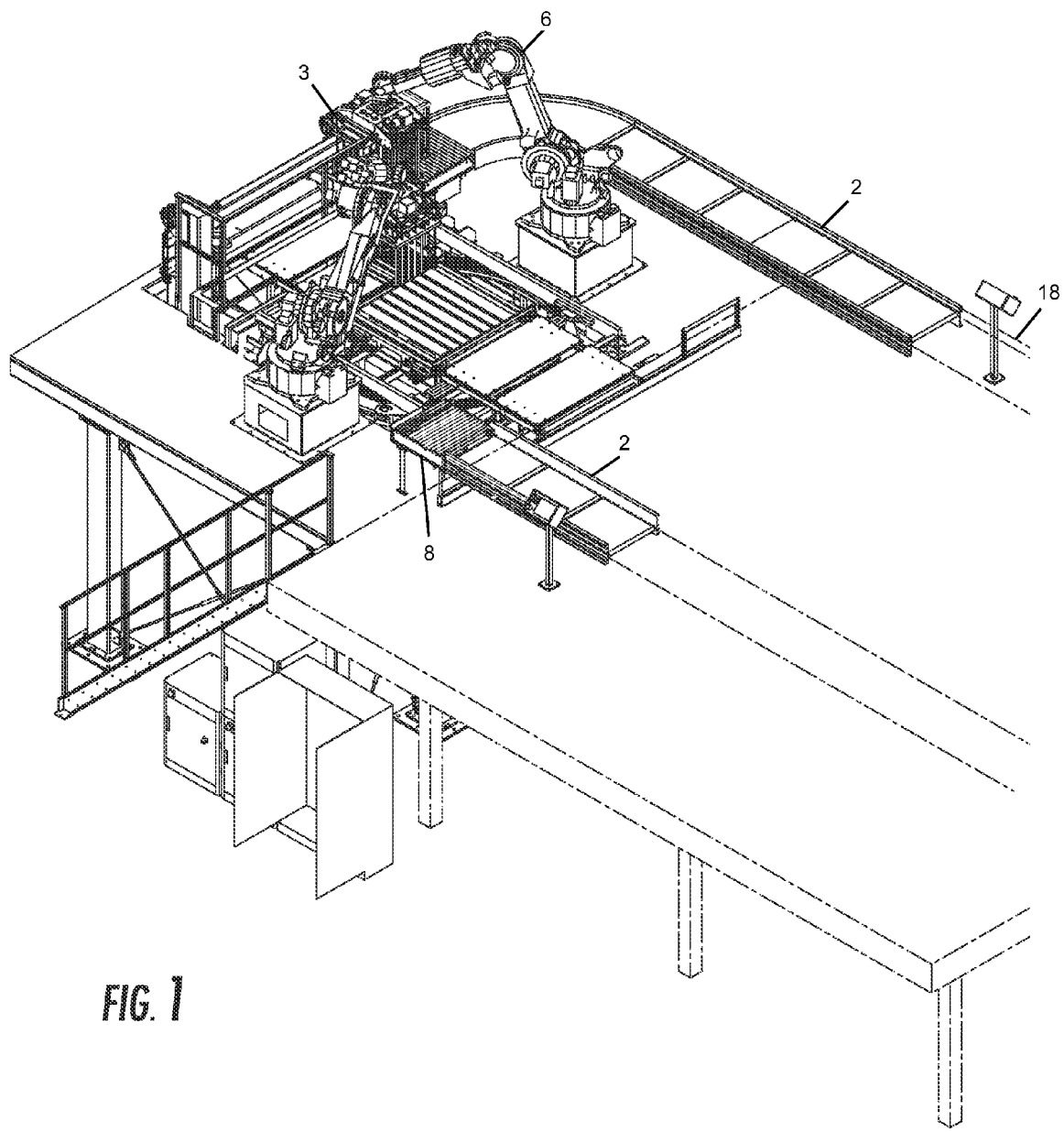
FIG. 1 is a perspective view of a stacking apparatus for multi-layer stacking on a support, according to an embodiment of the invention.
Figure 2:
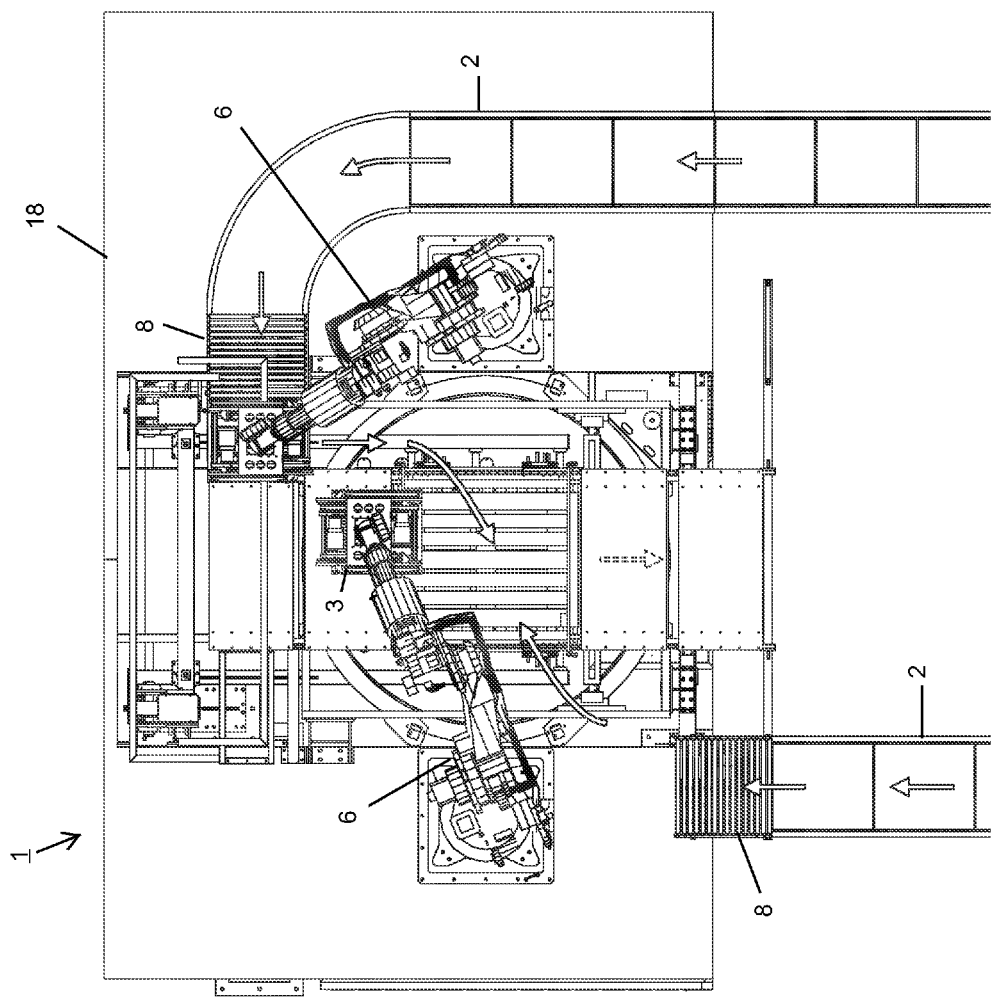
FIG. 2 is a top plan view of the stacking apparatus in FIG. 1.
Figure 3:
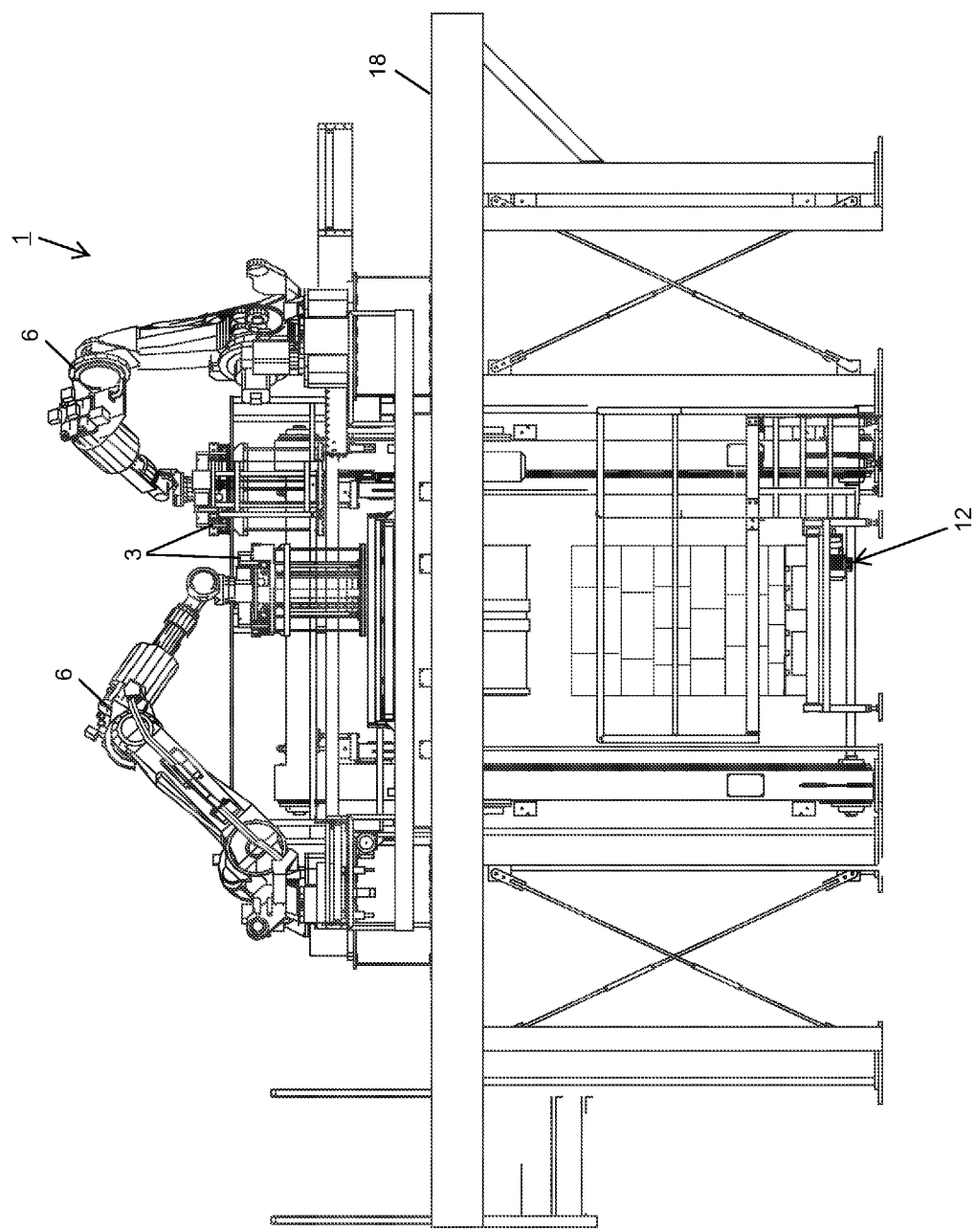
FIG. 3 is an end elevation of the stacking apparatus in FIG. 1.

Referring now to the drawings and the illustrative embodiments depicted therein, a stacking apparatus 1 is provided for multi-layer stacking of objects on a support (FIGS. 1-3). The objects are positioned in a spatial arrangement to form a stacked support. Apparatus 1 includes a control, such as a programmed general purpose computer 10, or the like, that is operable to determine a particular order and spatial positions of the objects to be stacked on the support. The supports may be a pallet or may be a roller truck or other such substructure. Apparatus 1 may utilize the principles disclosed in International Application Publication No. WO 2008/122480 A1 entitled METHOD AND DEVICE FOR LAYERED STACKING ON A SUPPORT and U.S. patent application Ser. No. 12/294,495 filed Sep. 25, 2008, by Fritzsche entitled PROCESS AND DEVICE FOR MULTI-LAYER STACKING ON A SUPPORT, the disclosures of which are hereby collectively incorporated herein by reference in their entirety. The details of such patent applications will not be repeated herein.

Apparatus 1 includes a handling device, such as an end-of-arm tool 3 that is responsive to control 10 to displace objects to respective spatial positions to form a stacked support. Objects are supplied from an object feed, such as a conveyor 2, to a transition section 8 where they may be grasped by tool 3. Tool 3 may be manipulated by a travel unit, such as a three or more degree-of-freedom robot arm 6 of the type that is known in the art. Such industrial robots are available commercially from multiple sources, such as Fanuc Robotics America, Inc. Details of tool 3 are disclosed in U.S. patent application Ser. No. 12/237,780 filed Sep. 25, 2008, by Fritzsche for a GRABBER FOR AUTOMATICALLY GRABBING PACKING UNITS, the disclosure of which is hereby incorporated herein by reference in its entirety and will not be repeated herein. Suffice it to say that end of arm tool 3 includes a support, such as a comb 7 that is capable of lifting objects off of conveyor 2 that is moveably supported by a support arm 11. Hold down device 4 grips an object between the hold down device and comb. End of arm tool 3 further includes a stripper 5 that is horizontally moveable along with support arm 11. Hold down device 4 may include a pressure element in the form of a resilient layer 13 that fills in voids in the interface with an object being grasped in order to more firmly and evenly grab the object. In the illustrated embodiment, resilient layer 13 is made from a flexible industrial foam of the type known in the art.

In use, robot arm 6 positions end of arm tool 3 adjacent an object to be transferred from conveyor 2 with support comb 7 between gaps in the conveyor of transition section 8 under the object. Stripper 5 is positioned between the object and support arm 11. Hold down device 4 is lowered to grasp the object at the front of tool 3. After robot arm 6 displaces tool 3 to a desired location at the top of the stacked support, tool 3 is retracted while stripper 5 and hold down device 4 are maintained in a stationary location in space. This is accomplished by horizontally moving the stripper and support arm 11, such as by a servo-operated belt drive, or the like, utilizing conventional servo control techniques. Stripper 5 and hold down device 4 maintain the object in a desired location on the stacked support while comb 7 is pulled out from under the object. Conveyors 2, handling devices 3, and travel units 6 are supported in an elevated fashion by a platform 18.

Figure 10:
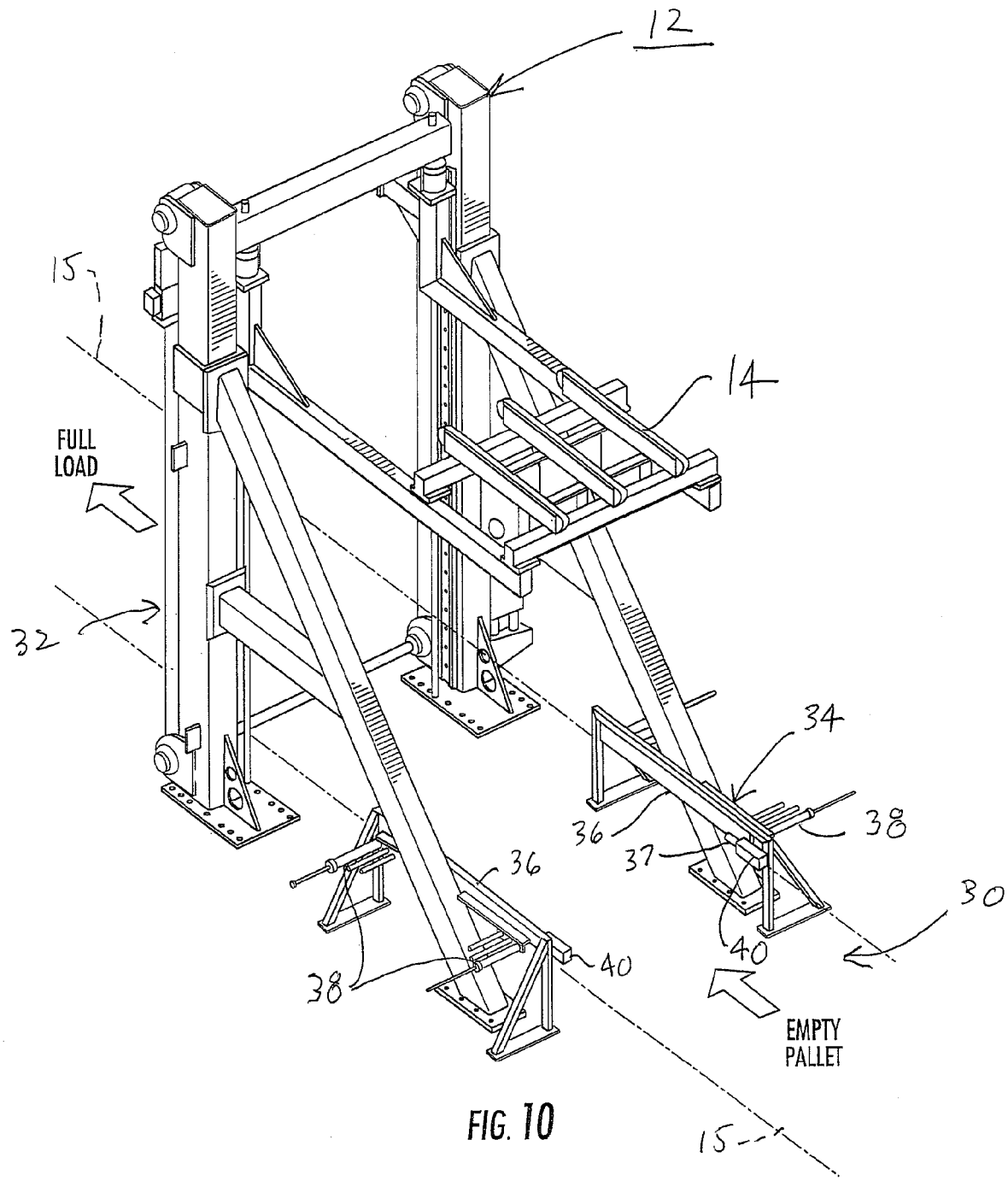
FIG. 10 is a perspective view of a support handler in an elevated orientation.
Figure 11:
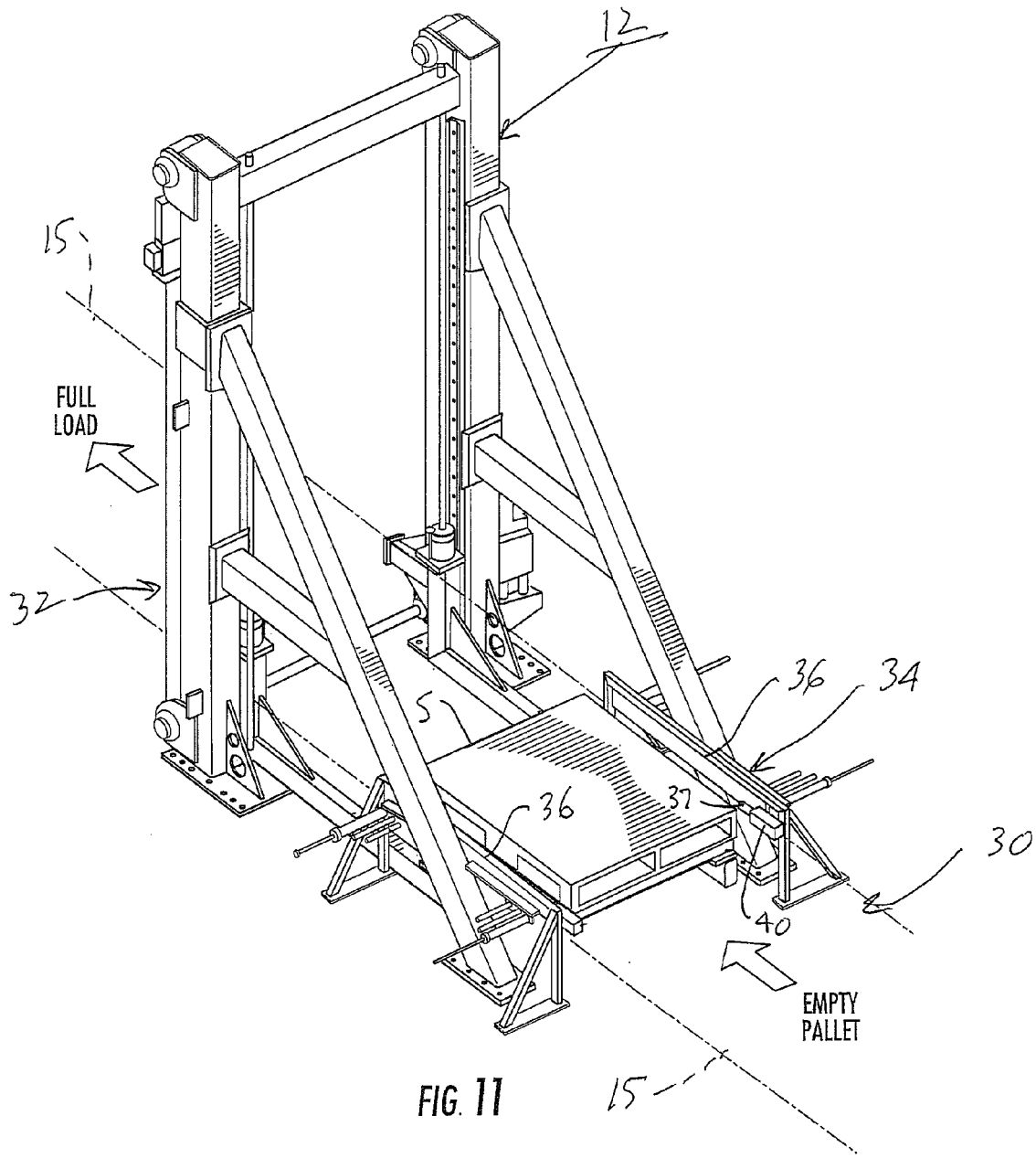
FIG. 11 is the same view as FIG. 10 showing the support handler in a lowered orientation for receiving a support.
Figure 12:
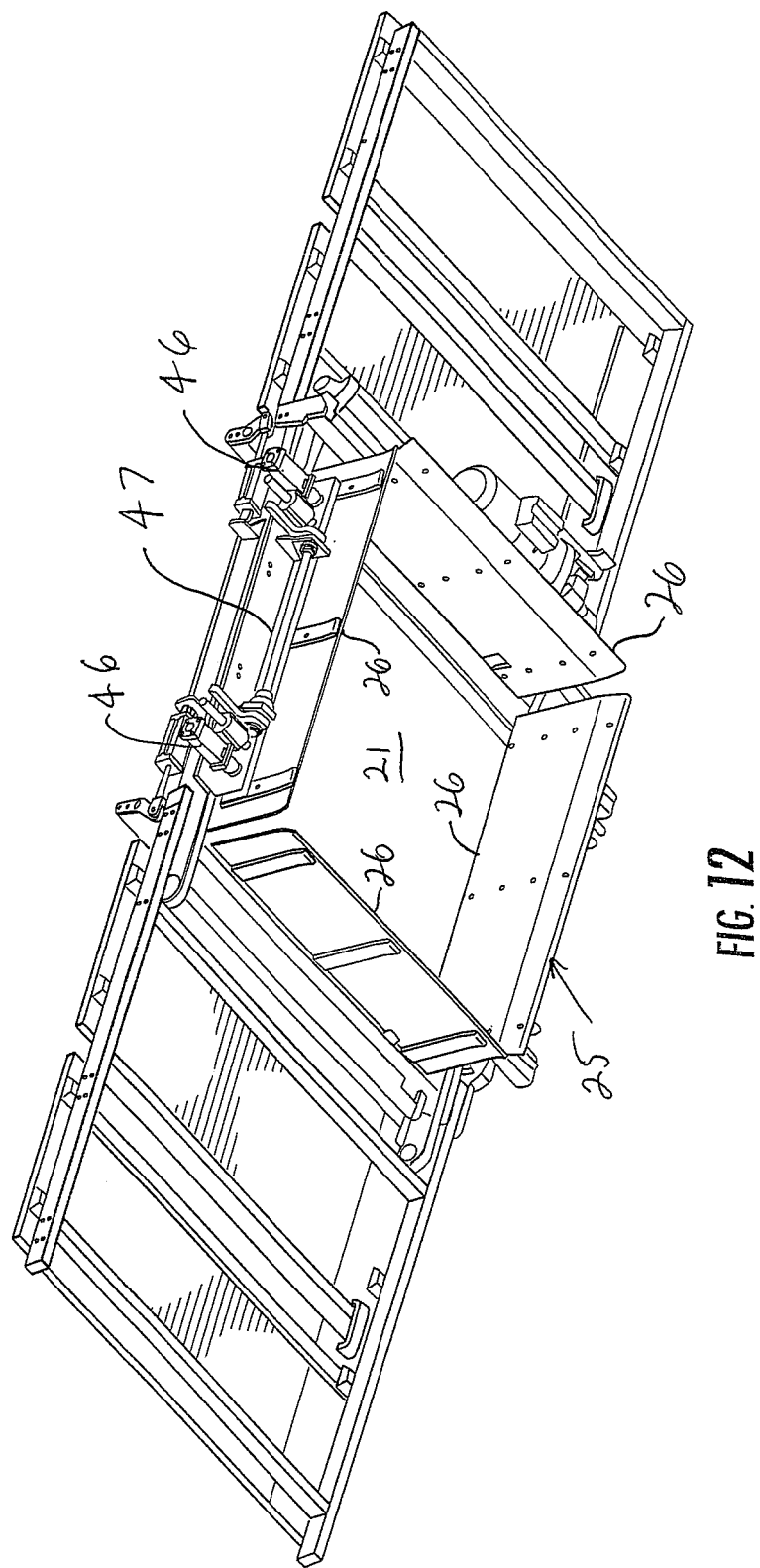
FIG. 12 is a perspective view underneath a placeholder taken from one lateral direction, according to an embodiment of the invention.

Apparatus 1 further includes a support handler 12 that is located below platform 18 (FIG. 3). Support handler 12 elevates a support S that is being stacked with objects of different sizes and shapes to form a stacked support. Support handler 12 also removes the stacked support and supplies an empty support S in place, to be stacked with objects. Support handler 12 includes a lift, such as a lifting table 14, for supporting a pallet during the stacking process (FIGS. 10 and 11). As will be described in more detail below, support handler 12 raises lifting table 14 upwardly to place an empty support S in position to receive objects and indexes lifting table 14 unidirectionally downwardly while support S is being stacked with articles. Empty supports S may be supplied to support handler 12 from a conveyor 15, and stacked supports may be discharged to a conveyor, which may be conveyor 15 or may be a separate conveyor. Support handler 12 includes an inlet 30 for receiving empty supports S and a discharge 32 for discharging stacked supports. Inlet 30 and discharge 32 may be at opposite sides of support handler 12. This facilitates use of one conveyor 15 to both supply empty supports S and discharge stacked supports. However, separate conveyors could be used.

Support handler 12 may further include an alignment device 34 for aligning empty supports on conveyor 15 with respect to lifting table 14. To accomplish this, alignment device 34 may include a pair of opposing plates 36 that are moved toward each other by actuators, such as pneumatic actuators 38, although electric or hydraulic actuators may be used. Alignment device 34 may also include one or more positioning devices, such as cylinders 40 mounted to a plate 36 having pushers 37 in order to position the support along the direction of movement of conveyor 15. In this manner, each support S can be properly positioned in two dimensions with respect to lifting table 14 to ensure that the support is properly positioned on the lifting table.

Apparatus 1 further includes a placeholder 20. The purpose of placeholder 20 is to receive objects displaced by handling device 3 while support handler 12 removes a stacked support and supplies an empty support. In this manner, end of arm tool 3 and robot 6 are able to begin building a new stack of objects even before an empty support has been brought into a stacking position. Once the support handler 12 positions an empty support in place, placeholder 20 transfers objects that have been placed on the placeholder to the empty support supplied by support handler 12. This reduces the amount of dwell time where end-of-art tool 3 and robot 6 are not able to displace objects. Such dwell time is usually the result of lifting table 14 discharging a stacked support and substituting an empty support.

Figure 4:
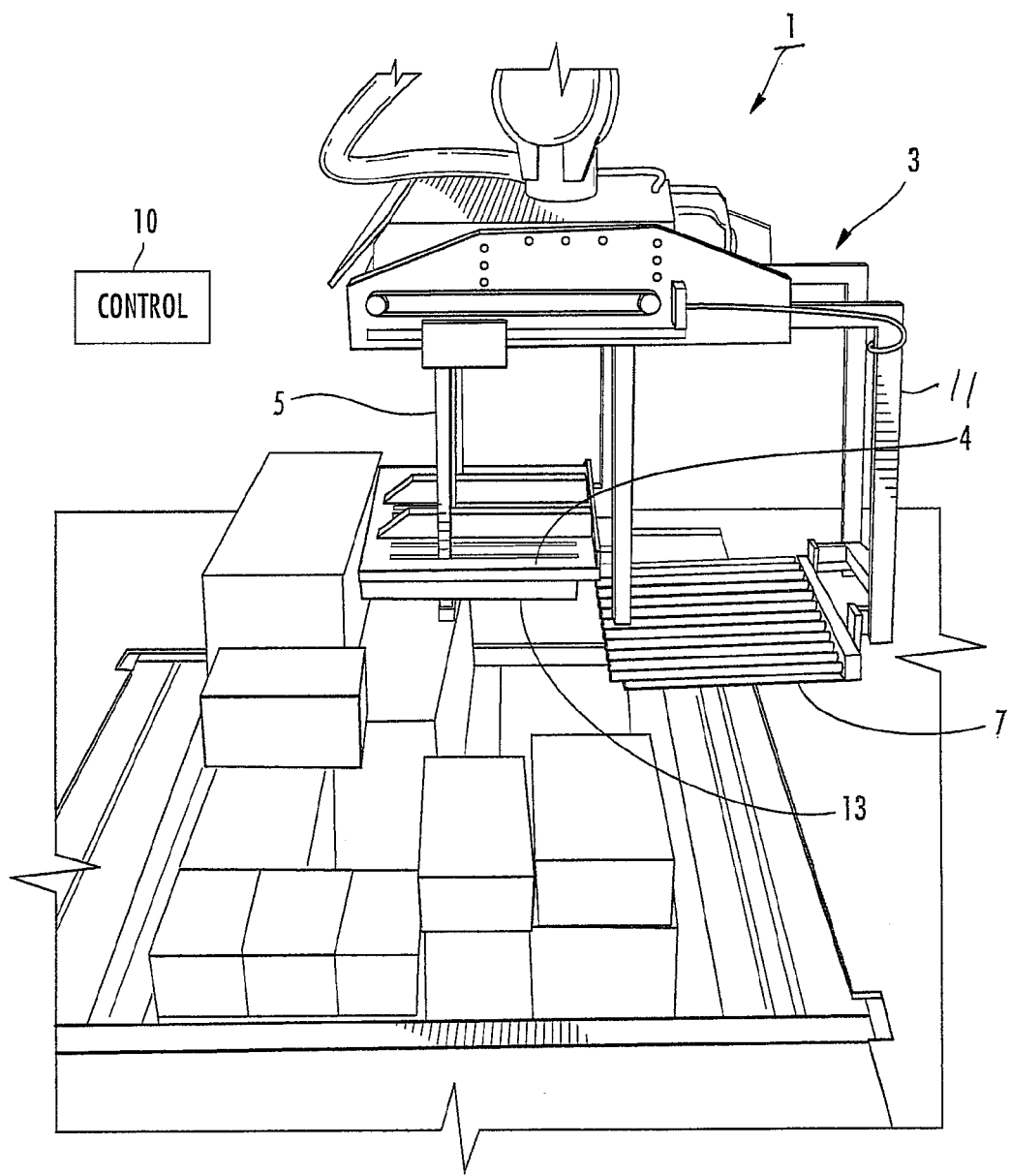
FIG. 4 is a perspective view of a handling device displacing objects to form a stacked support.
Figure 5:
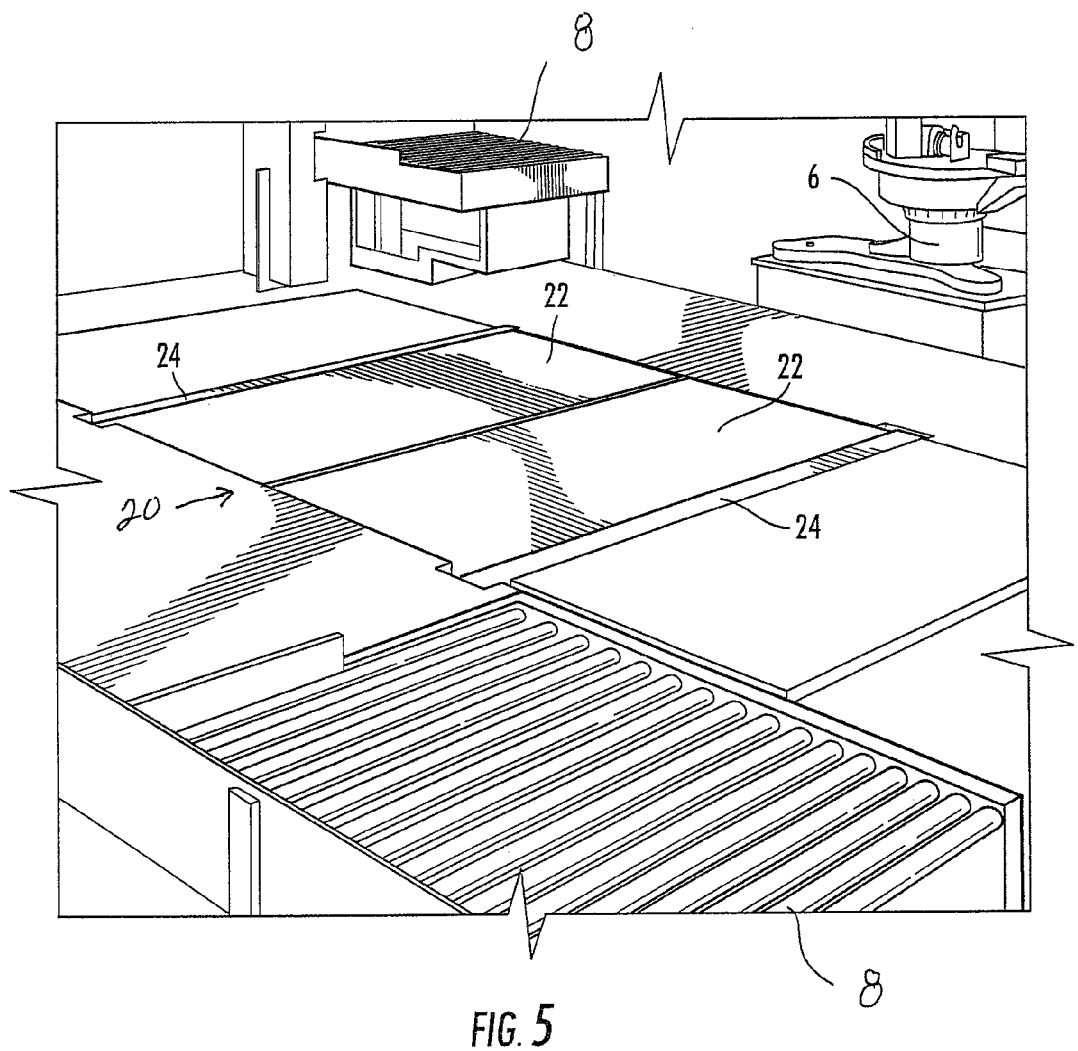
FIG. 5 is a perspective view of a placeholder in a first mode or use position.
Figure 6:
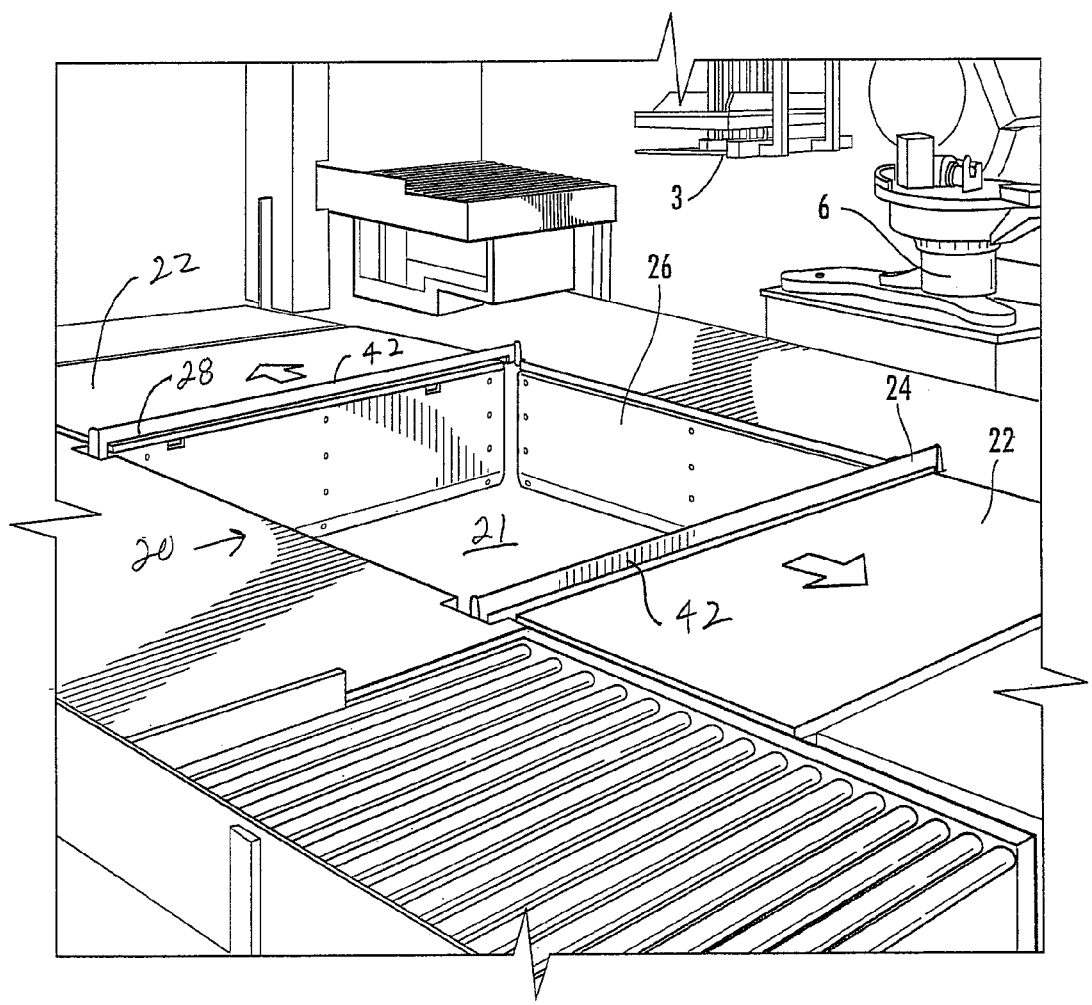
FIG. 6 is the same view as FIG. 5 with the placeholder moving to a second mode or non-use position.
Figure 7:
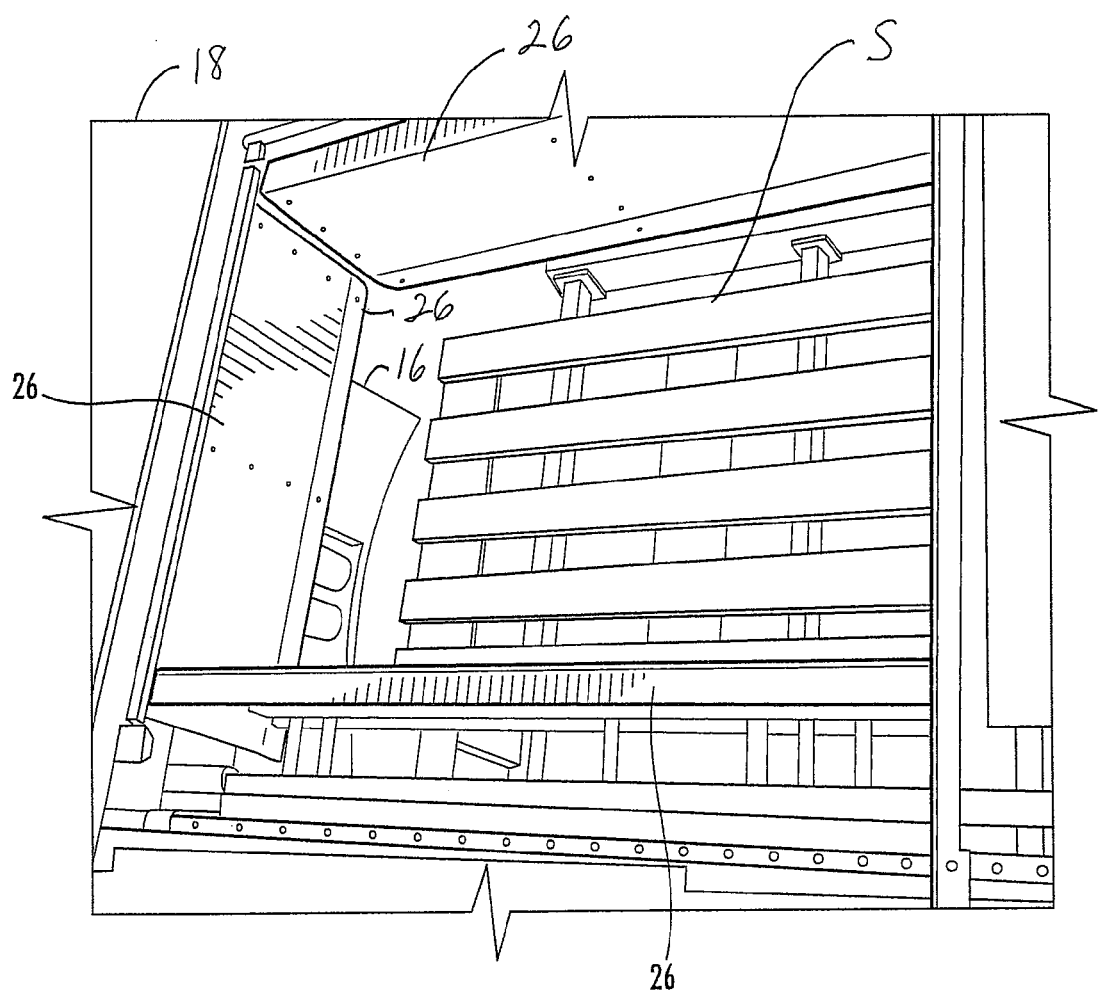
FIG. 7 is a perspective view with the placeholder removed to reveal details of an empty support ready to be stacked with objects.
Figure 8:
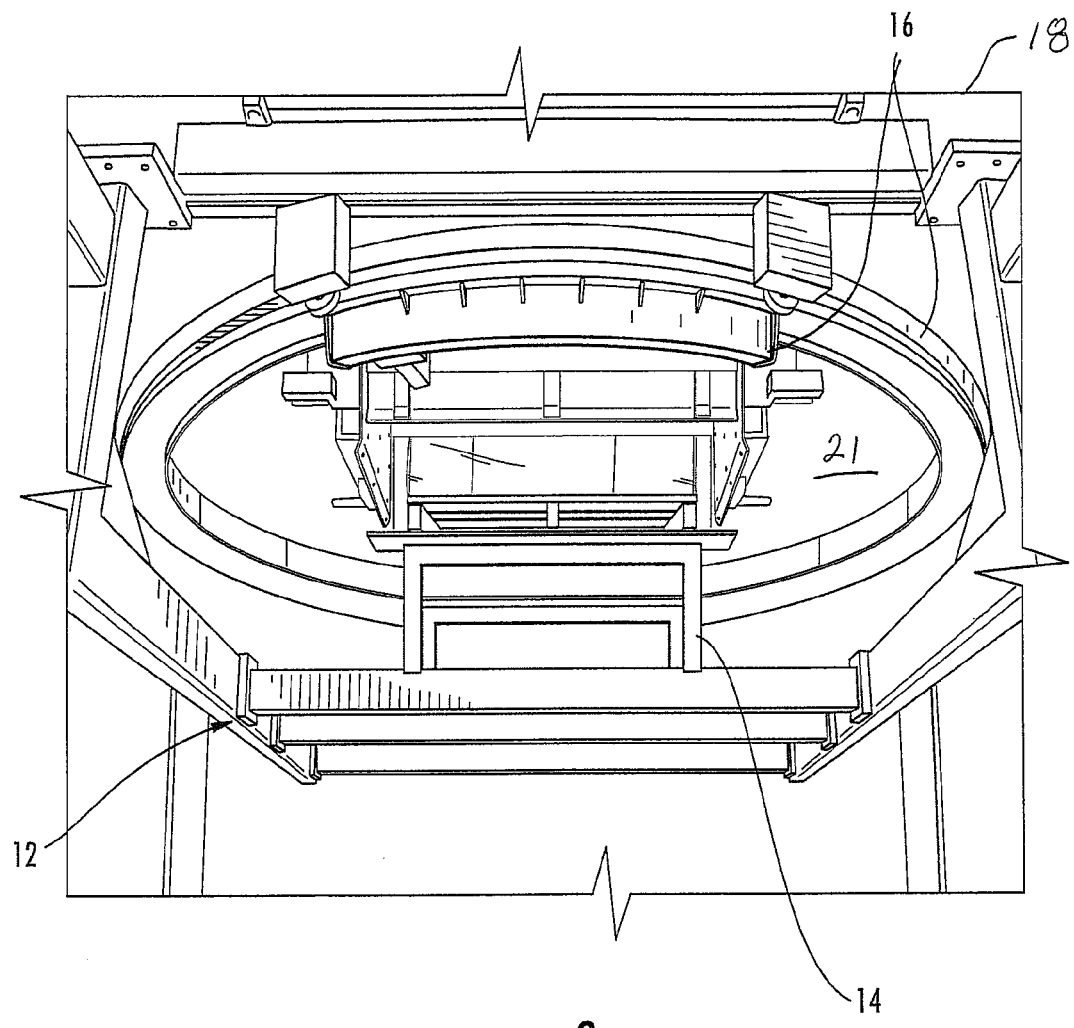
FIG. 8 is a perspective view of a support handler elevating a support being stacked with objects to form a stacked support.
Figure 9:
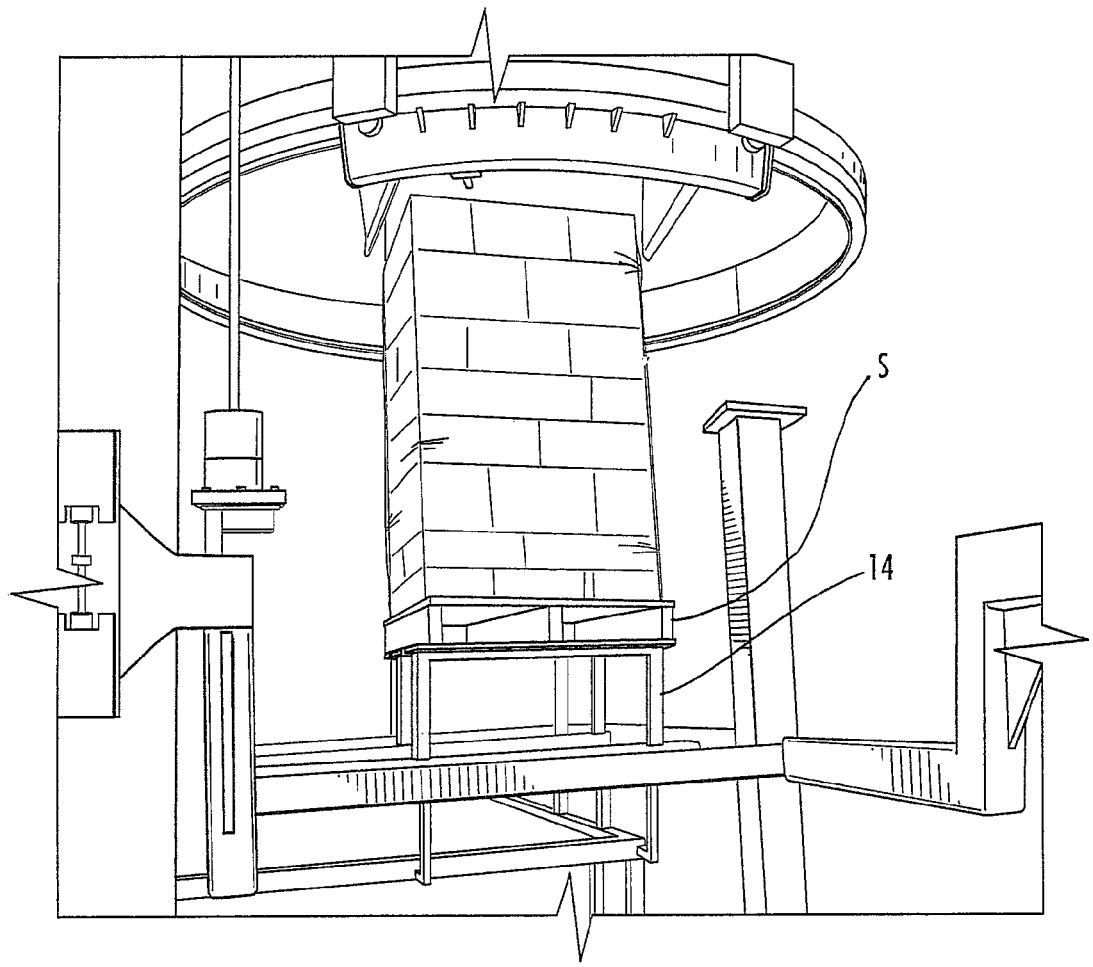
FIG. 9 is the same view as FIG. 8 showing a formed stacked support.

Placeholder 20 is above support handler 12. Placeholder 20 has a first mode shown in FIG. 5, which is a use position, for receiving objects on the placeholder and a second mode shown in FIG. 4, which is a non-use position, for providing access to a support S on support handler 12. The placeholder is in the first mode while support handler 12 removes a stacked support and supplies an empty support. Placeholder 20 is in the second mode when support handler 12 has elevated support and that support is being stacked with articles. Furthermore, placeholder 20 deposits objects that have been received on placeholder 20 when in its first mode to the empty support that has been elevated into position by support handler 12 when placeholder 20 changes from the first mode to said second mode as illustrated in FIG. 6 (which does not show the objects or the support).

Placeholder 20 cooperates with an opening 21 in platform 18 that is generally aligned with support handler 12. Placeholder 20 includes one or more support surfaces, each defined by a plate 22. Support surface 22 generally covers opening 21 when placeholder 20 is in the first mode and exposes opening 21 when placeholder 20 is in the second mode. In the illustrated embodiment, support surface 22 is made up of two plates 22, or support surfaces, which move away from each other horizontally as placeholder 20 changes from the first mode to the second mode. Support surfaces 22 move toward each other when placeholder 20 changes back to the first mode.

Figure 13:
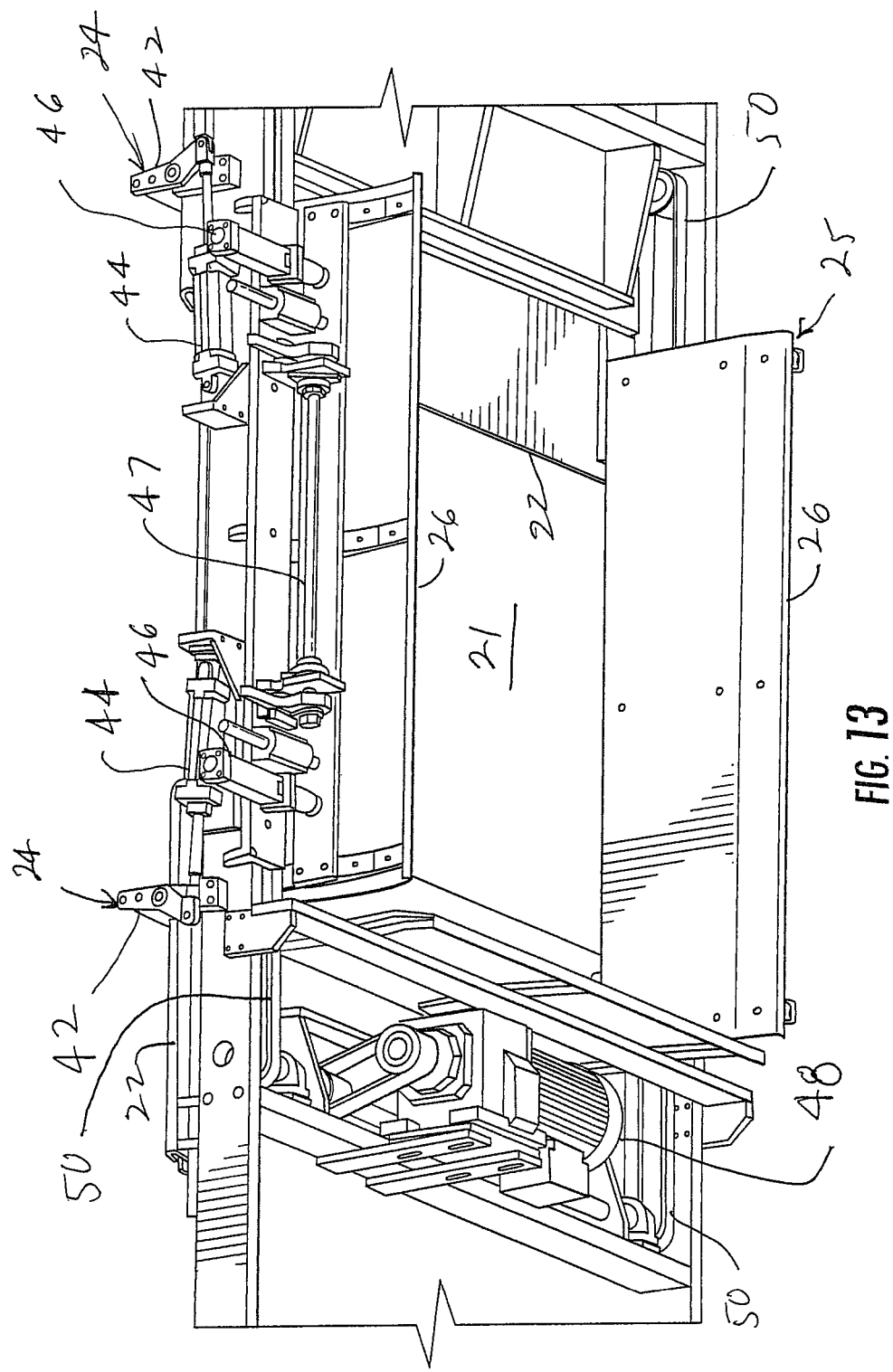
FIG. 13 is an enlarged perspective view underneath the placeholder in FIG. 12 taken from an opposite lateral direction.
Figure 14:
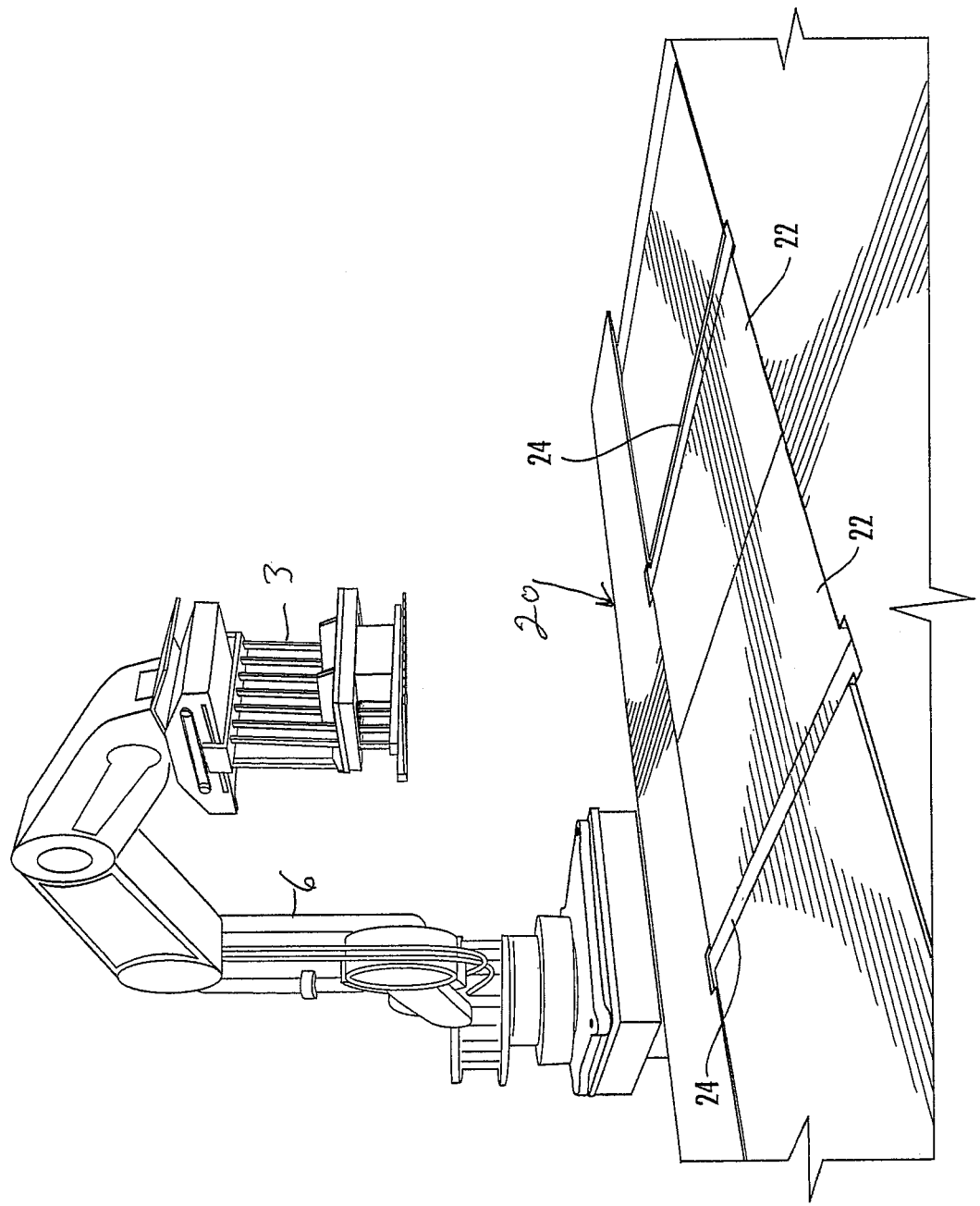
FIG. 14 is a perspective view of a stacking apparatus with a placeholder in a first mode in which the placeholder is in a use position.
Figure 15:
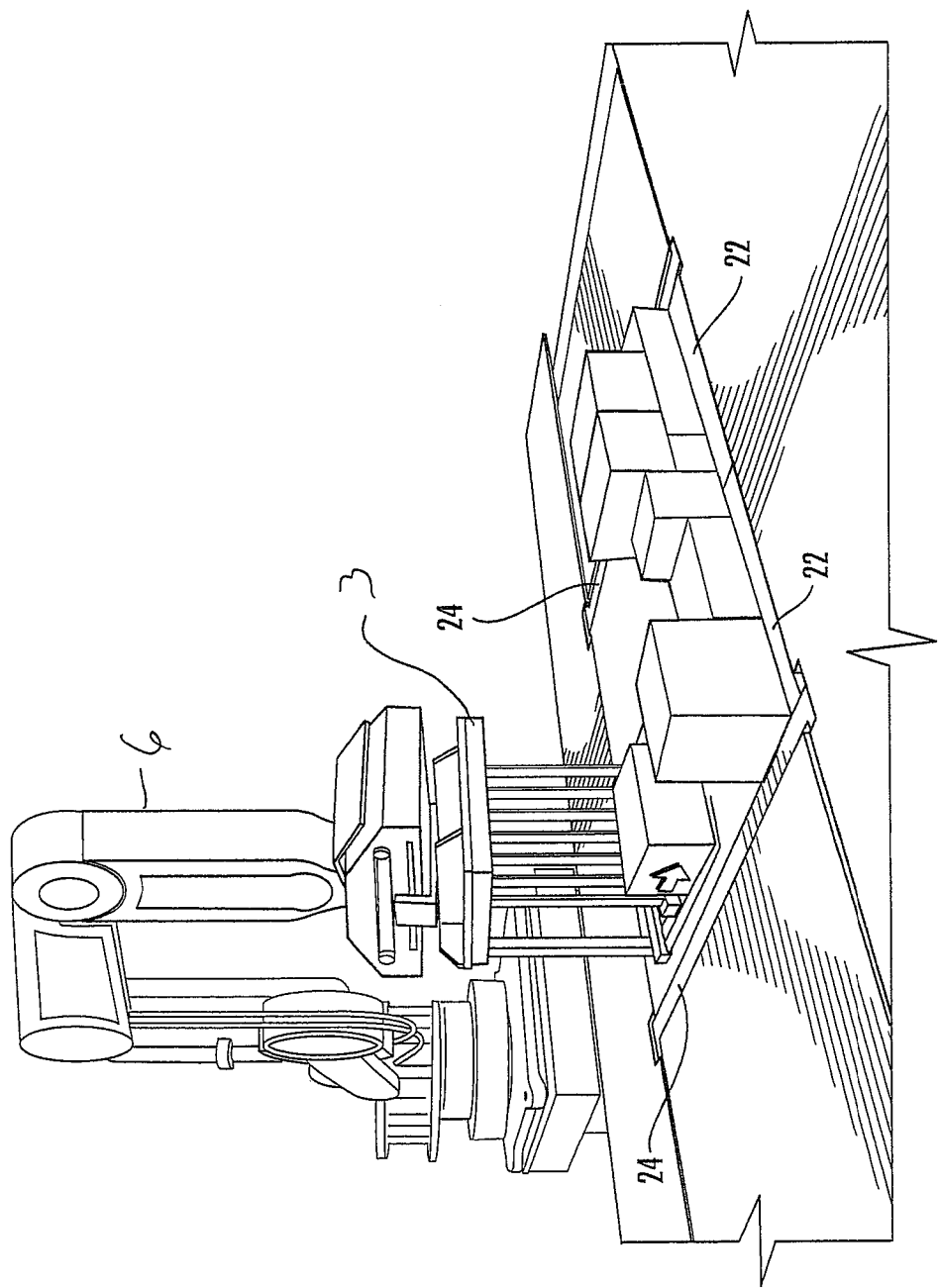
FIG. 15 is the same view as FIG. 14 showing objects being displaced to the placeholder when in its use position.
Figure 16:
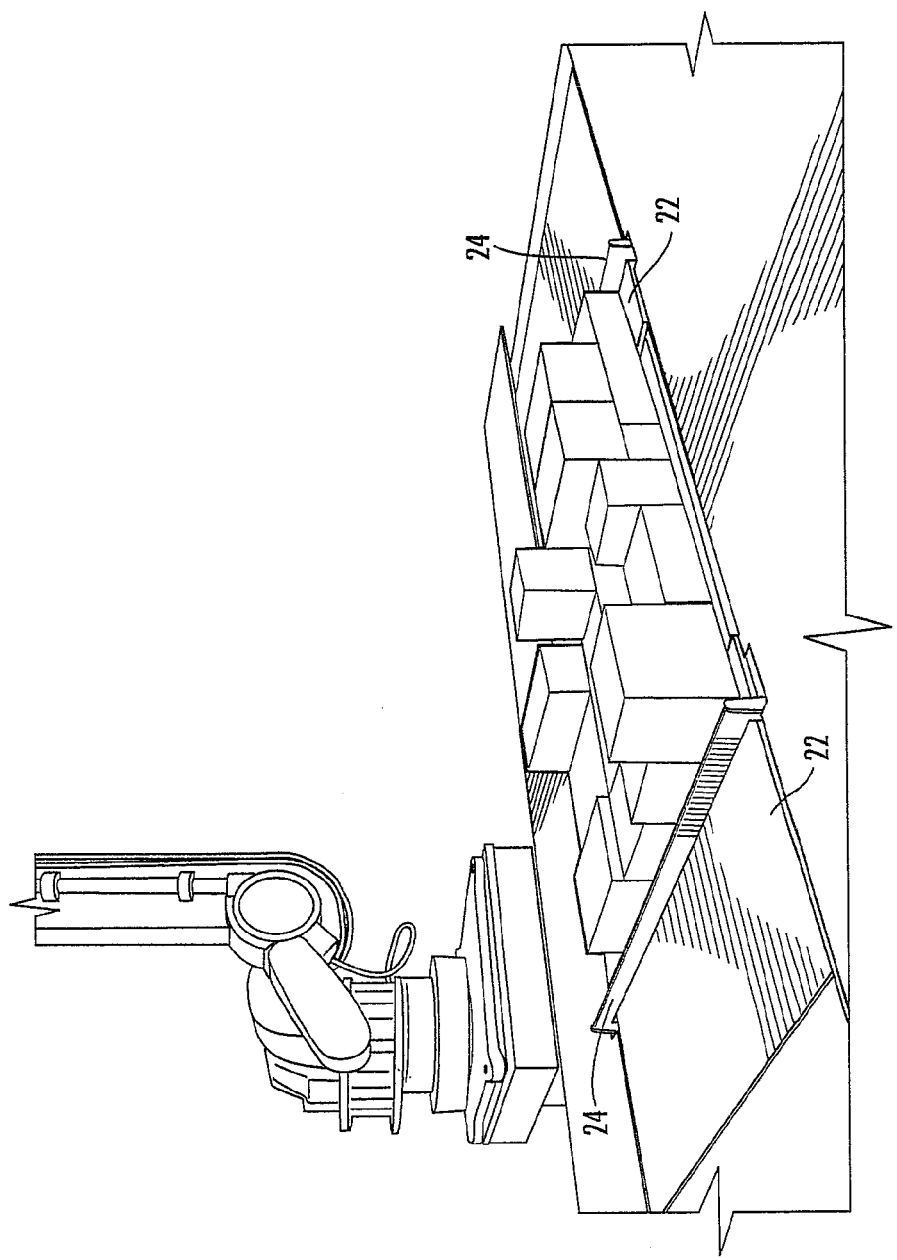
FIG. 16 is the same view as FIG. 14 showing the placeholder beginning transitioning from its first mode to its second mode, which is its non-use position.
Figure 17:
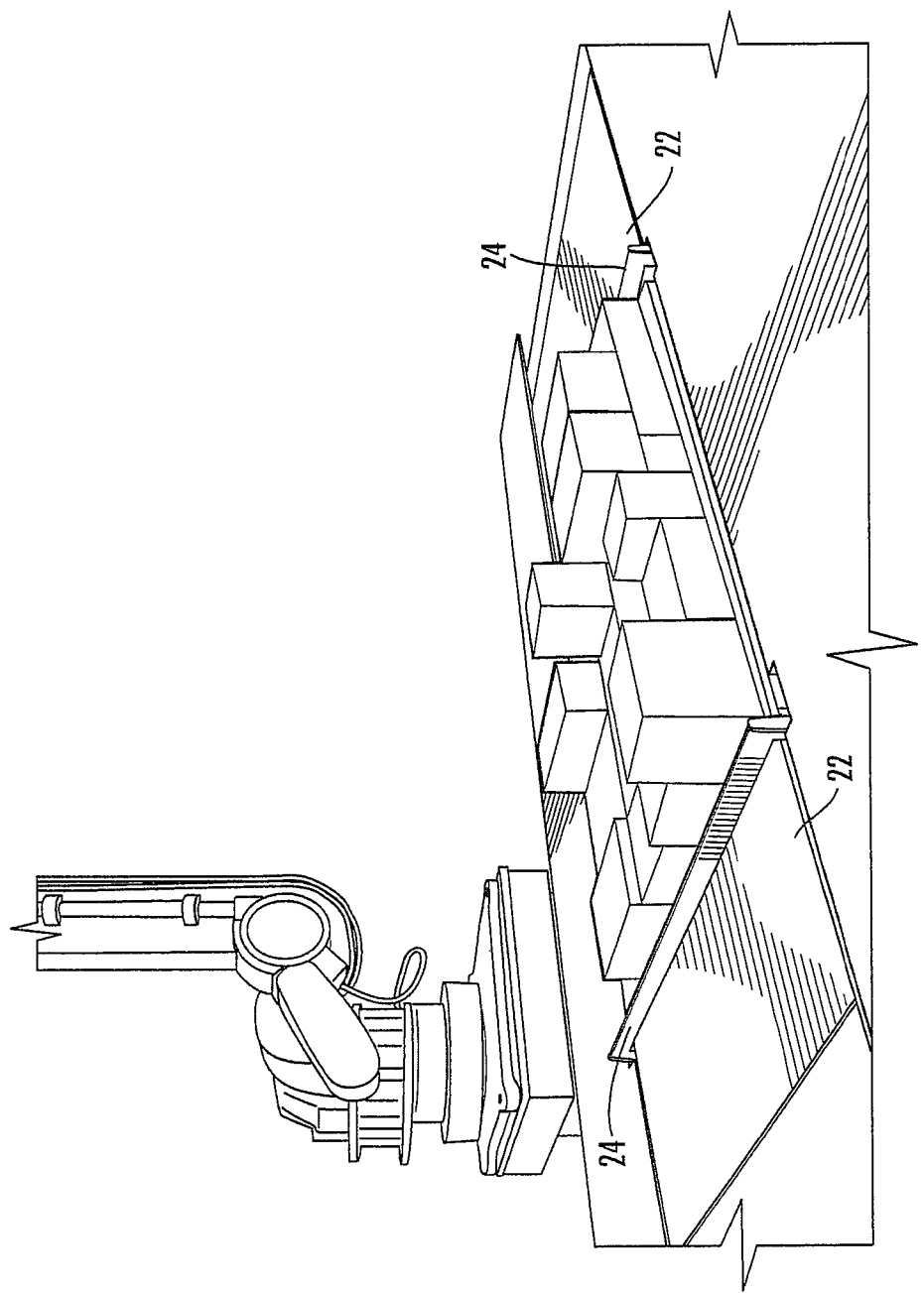
FIG. 17 is the same view as FIG. 14 showing the placeholder completing transitioning from its first mode to its second mode.
Figure 18:
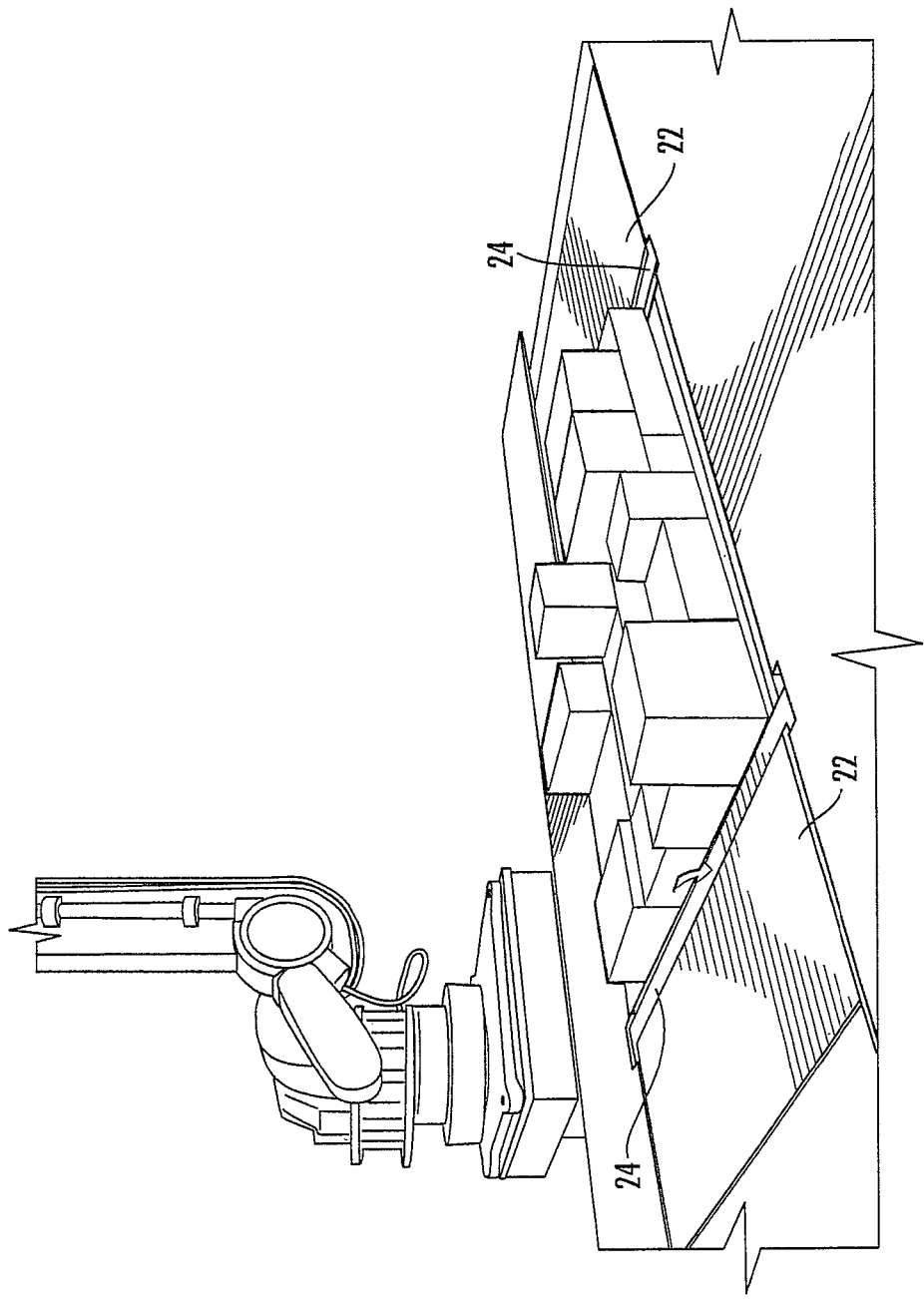
FIG. 18 is the same view as FIG. 14 showing the placeholder in its second mode.
Figure 19:
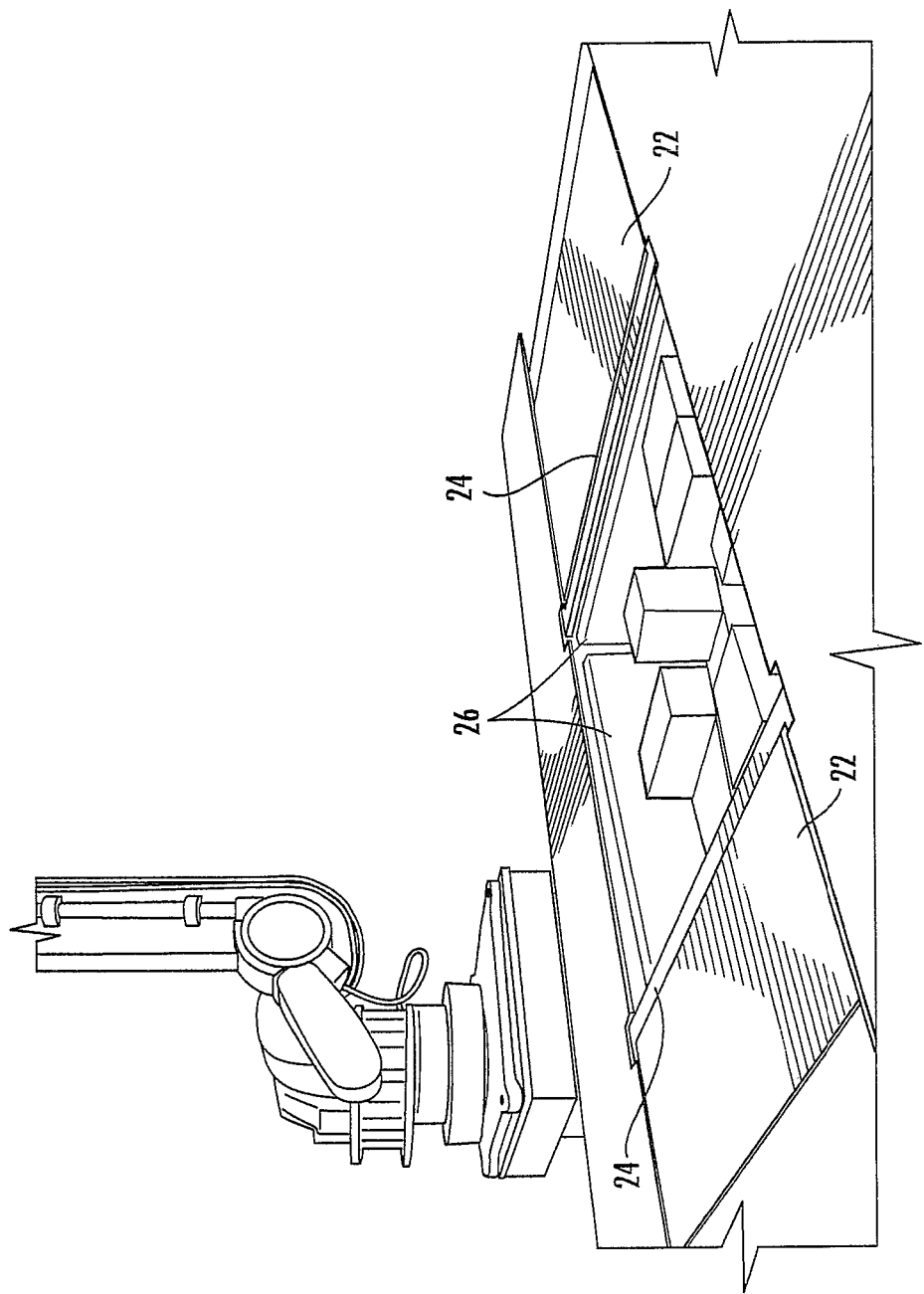
FIG. 19 is the same view as FIG. 14 showing a stacked support being removed from the stacking apparatus.

Plates 22 may be horizontally moved by a common actuator, such as a motor 48 that propels a pair of belts 50 on opposite sides of the plates (FIG. 13). Belts 50 engage the plates such as by a cog configuration in a manner that moves the plates away from each other with belts 50 moving in one direction and toward each other with belts 50 moving in an opposite direction as would be understood by the skilled artisan. Placeholder 20 includes one or more stops 24. Stop(s) 24 restrain objects that have been received on a support surface 22 during the first mode as placeholder 20 changes from the first mode to the second mode. In the illustrated embodiment, there are two stops 24, each laterally outwardly from one of support surfaces 22 when the support surfaces are in the first mode. In this manner, support surfaces 22 are generally parallel with each other and are generally parallel with sides of a support S. Each stop 24 includes a restraining surface 28. Restraining surface 28 is in a position generally horizontally aligned with support surfaces 22 when placeholder 20 is in the first mode, as illustrated in FIGS. 5, 14 and 15, and is in a position above its adjacent support surface when placeholder 20 changes from the first mode to the second mode, as illustrated in FIGS. 6, 16 and 17. Restraining surfaces 28 may return to a position generally aligned with support surfaces 22 when placeholder 20 has fully entered the second mode, as illustrated in FIGS. 18 and 19. Each restraining surface 28 is defined by a bar 42, which is pivotally mounted to rotate about a horizontal axis to raise and lower restraining surface 28. Bar 42 is rotated by an actuator 44, which is illustrated as an electrical actuator, but may be a pneumatic or hydraulic actuator (FIG. 13).

Stacking apparatus 1 may further include a load stabilization system 25. Load stabilization device 25 stabilizes a stacked support while it is being stacked with objects. In the illustrated embodiment, load stabilization system 25 is made up of at least two opposing transition plates 26 at opening 21. An actuator 46 may be provided to move transition plates 26 toward each other while support handler 12 is maintaining a stacked support stationary. Actuator 46 moves transition plates 26 away from each other and away from the stack of objects while support handler is moving a stacked support. In the illustrated embodiment, two actuators 46 are used to move each plate 26, with a synchronizing rack and pinion mechanism 47 to coordinate their motion. Load stabilization system 25 may include two pairs of opposing transition plates 26 defining a quadrilateral perimeter at the opening. The other pair of transition plates 26 may be stationary or may be moveable as well in the manner previously described. Actuator 26 is illustrated as an electrical actuator, but may be a pneumatic or hydraulic actuator.

Load stabilization system 25 may further include an integrated wrapping unit that is operable to wrap the stacked support with a film or mesh. The wrapping unit, such as a stretch wrap tool 16, which is commercially available, is illustrated as being stationary and wrapping the stack as load support handling device 12 indexes the stacked support downwardly. Stretch wrap tool 16 also stabilizes the stacked support when it is completed. A fully wrapped stacked support leaves apparatus 1 when pelletization is complete. This provides stabilization throughout the travels of that stacked support to its final destination, such as a retail establishment, or the like.

In the illustrated embodiment, support handler 12 is below placeholder 20. Thus, support handler 12 discharges a stacked support and supplies an empty support from below placeholder 20. Placeholder 20 is moveable between a use position illustrated in FIG. 5 and a non-use position illustrated in FIG. 4. Placeholder 20 covers opening 21 in platform 18 above support handler 12 when in its use position and exposes the support handler when in its non-use position. End of arm tool 3 and robot 6 displace objects to placeholder 20 when the placeholder is in the use position illustrated in FIG. 5. When the placeholder is in its non-use position, illustrated in FIG. 4, end of arm tool 3 and robot 6 displace objects to a stacked support. Objects are displaced to either placeholder 20 or the stacked support from conveyor 2 that may supply the objects in a particular sequence. However, apparatus 1 may also be used with objects that are supplied in a more random sequence as well. Apparatus 1 may include one end of arm tool 3 and robot 6 or multiple pairs, such as disclosed in the previously referred to patent applications. If multiple pairs are used, each pair will typically be supplied by a separate conveyor 2 as illustrated in FIGS. 1 and 2. However, multiple pairs may be used to displace objects to the same pallet as described in the previously referred to patent applications.

Once support handler 12 has discharged a stacked support and replaced it with an empty support, placeholder 20 deposits objects stacked thereon to the empty support. This is accomplished by the placeholder moving from its use position to its non-use position. Plate(s) 22 are horizontally moveable between the use position, illustrated in FIG. 5, and the non-use position, illustrated in FIG. 4. Restraining surfaces 28 of stop(s) 24 are generally vertically moveable between a retracted position illustrated in FIG. 5 and an extended position illustrated in FIG. 6 during the transition. Restraining surfaces 28 are in their extended position when plate(s) 22 move horizontally between their use position and their non-use position to stabilize the objects while the objects on the flat plate(s) are being transferred to an empty support that has been positioned beneath the placeholder. The stop(s) restrain objects so that the objects do not substantially move horizontally with the retracting plates. Although only two stops 24 are illustrated, it envisioned that two additional such stops may be provided. The additional stops would be spaced apart from each other in the same fashion as the ones shown and would be perpendicular to the ones shown. The additional stops would be to restrain the other two sides of the stack of objects being formed as plates 22 move from their use to their non-use position.

Operation of apparatus 1 can best be understood by reference to FIGS. 14 through 19. With placeholder 20 in its use position illustrated in FIG. 14, the prior support is fully stacked and is being discharged such as to an awaiting truck or temporary storage within a warehouse. As seen in FIG. 15, handling device 3 and travel unit 6 begin to deliver objects to placeholder 20, such as in a predetermined arrangement as determined by control 10. Once support handler 12 has discharged the stacked support and has replaced the stacked support with an empty support, placeholder 20 begins to move from its use position to its non-use position thereby transferring objects stacked on the placeholder to the awaiting empty support, as illustrated in FIG. 16. This is accomplished by restraining surfaces 28 of stops 24 becoming elevated to maintain the positions of the stacked objects while the plates horizontally retract. Once plates 22 are fully retracted, as illustrated in FIG. 17, the objects stacked on the placeholder are fully transferred to the support. Stops 24 may be retracted. The placeholder remains in its non-use position throughout the completion of that stacked support, as illustrated in FIG. 18. Completion of the stacked support is accomplished by end of arm tool 3 and robot 6 displacing objects from conveyor 2 to the stack in a particular arrangement as determined by control 10. As the stack is completed, as illustrated in FIG. 19, placeholder 20 may once again move to its use position illustrated in FIG. 4 as support handler 12 replaces the stacked support with an empty support.

Figure 20:
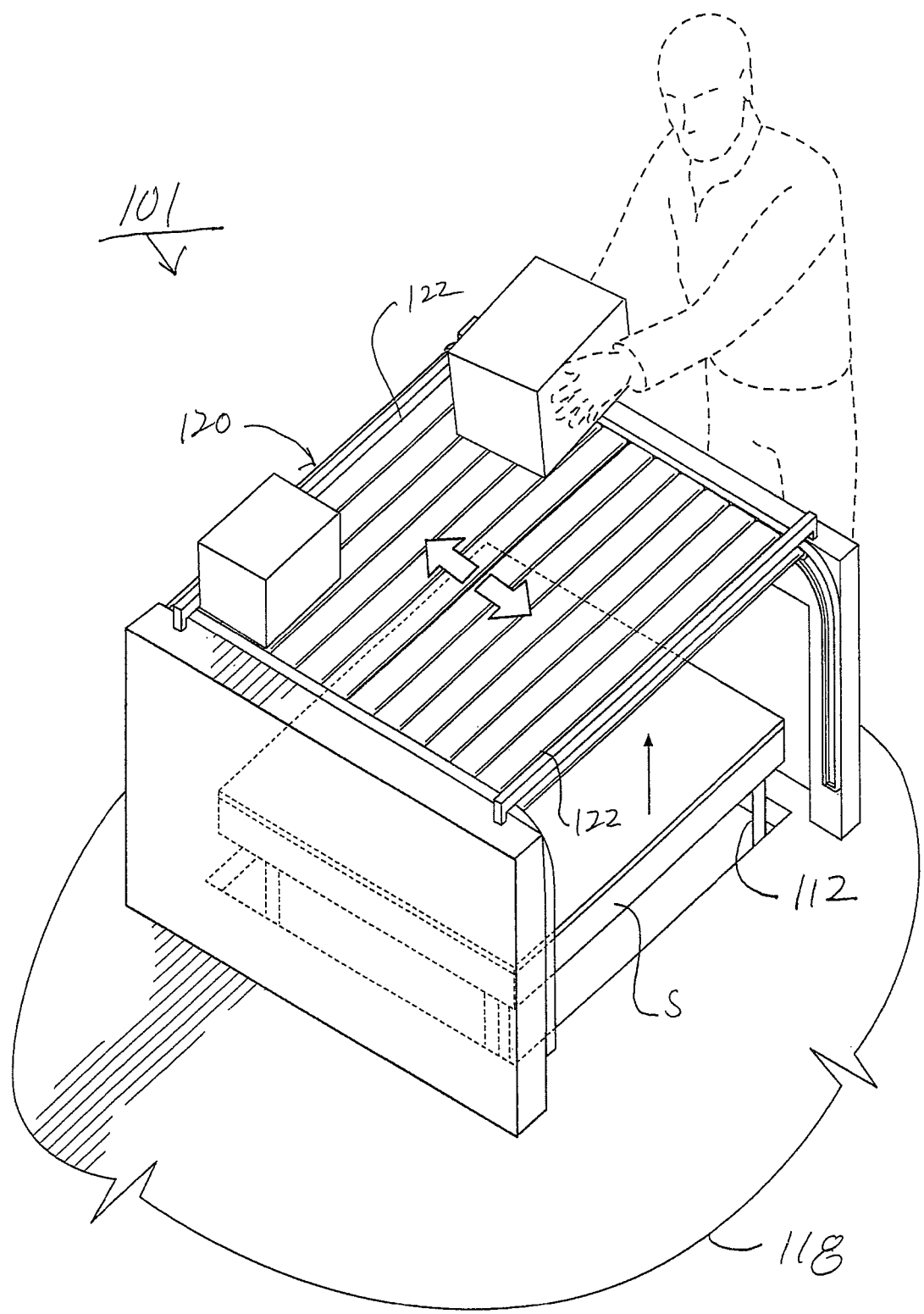
FIG. 20 is a perspective view of an alternative embodiment of a stacking apparatus, according to an embodiment of the invention.

An alternative embodiment of a stacking apparatus 101 is illustrated in FIG. 20. Stacking apparatus 101 is used for manual stacking of a support. Stacking apparatus 101 includes a placeholder 120 that receives objects thereon when in a first mode illustrated in FIG. 20. When placeholder 120 is in such use position, a support handler generally shown at 112 can remove a stacked support S and replace it with an empty support S as illustrated in FIG. 20. Placeholder 120 is elevated above platform 118 in order to position the stack of objects at about the waist height of the operator in order to reduce bending motion of the operator. Moreover, placeholder 120 may be made up of a series of interconnected plates 122. In this manner, plates 122 can retract generally downwardly in a motion similar to opening of a garage door as the placeholder changes from the first mode illustrated in FIG. 20 to the second mode (not shown). This provides open space laterally on one or both sides of placeholder 120. Thus, an operator would be free to move around placeholder 120 should the operator be receiving objects from two conveyors (not shown) in the same general fashion that conveyors 2 supply objects to handling device 3 and travel unit 6. Other embodiments will be apparent to the skilled artisan.

Other techniques may be utilized to reduce cycle time and/or to improve load density. For example, a bunching unit may be provided to allow the handling device to pick up multiple objects at a time. The bunching unit may be in the form of a stacking unit (not shown) that may be provided at conveyor 2 upstream of tool 3 and robot arm 6. The stacking unit may be used to stack at least some objects prior to being displaced by tool 3. This is especially useful where multiple objects are provided having some dimensions that allow the objects to be stacked while having a common footprint. Because tool 3 is able to displace multiple objects at once, cycle time is reduced. Alternatively, the bunching unit may be in the form of a horizontal object accumulator to accumulate multiple objects in a fashion that the multiple objects can be grasped at one time by the handling device.

An object reorientation device may be provided to reorient the object, such as about a horizontal axis. This would allow some objects to fit better within a location of the stacked support. Thus, an object that is long and narrow may be reoriented with its long axis vertically oriented to fit a space on the stacked support. Such reorientation may be performed by a separate robot unit upstream of tool 3 and robot arm 6 or may be performed by tool 3 and arm 6 grasping an object, reorienting the object, setting down and regrasping the object. A separate reorientation unit would reduce cycle time, but may not be necessary if reorienting of objects is infrequent.

A dimensioner may be provided along conveyor 2 to check dimensions of objects against the dimensions specified for that SKU in the database. This avoids errors and resulting shutdowns from occasional dimensional changes made by manufacturers to a particular SKU.

Although travel unit 6 is illustrated as a robot arm, it should be understood that other units may be used, such as gantry-type travel units. Also, it should be understood that handling device 3 and travel unit 6 may be stationary or rail-mounted for use in stacking a moving support, such as for use with assembly line applications, or the like.

It should also be understood that conveyors 2 can be supplied from one or more known sequencing technologies, such as automated storage and retrieval systems (ASRS), multi-shuttle systems, buffering systems, robotic depalletizer systems, or the like.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A mixed article stacking apparatus for stacking objects of different sizes on a support, said apparatus comprising:
    a control operable to determine a particular order and spatial positions of the objects to be stacked on the support;
    a handling device that is adapted to manipulate articles of different sizes in response to said control;
    a support handler, said support handler manipulating a support being stacked with objects to form a stacked support, said support handler further removing a stacked support and supplying an empty support; and
    a placeholder above said support handler, said placeholder controlled by said control to change between a first mode for receiving objects from said handling device on said placeholder and a second mode for providing access to a support on said support handler, said placeholder being in said first mode while said support handler removes a stacked support and supplies an empty support, wherein objects are deposited on said placeholder by said handling device during said first mode and wherein said placeholder deposits objects that have been placed on said placeholder by said handling device during said first mode to the support when said placeholder changes from said first mode to said second mode and wherein said handling device continues to place objects on the support during said second mode to thereby complete a stacked support.

2. The apparatus as claimed in claim 1 wherein said placeholder is used with an opening generally aligned with said support handler, said placeholder comprising at least one support surface, said at least one support surface generally covering said opening in said first mode and exposing said opening in said second mode.

3. The apparatus as claimed in claim 2 wherein said at least one support surface comprises at least two support surfaces, said at least two support surfaces moving away from each other horizontally as said placeholder changes from said first mode to said second mode.

4. The apparatus as claimed in claim 2 wherein said placeholder includes at least one stop, said at least one stop restraining objects that have been received on said at least one support surface as said placeholder changes from said first mode to said second mode.

5. The apparatus as claimed in claim 4 wherein said at least one stop comprises a restraining surface, wherein said restraining surface being in a position generally aligned with said at least one support surface when said placeholder is in said first mode and wherein said restraining surface is in a position above said at least one support surface when said placeholder changes from said first mode to said second mode.

6. The apparatus as claimed in claim 5 wherein said at least one stop rotates said restraining surface between said position generally aligned with said at least one support surface and said position above said at least one support surface.

7. The apparatus as claimed in claim 2 including a load stabilization system, said load stabilization system stabilizing a stacked support while it is being stacked with objects.

8. The apparatus as claimed in claim 7 wherein said load stabilization system comprises at least two opposing transition plates at said opening.

9. The apparatus as claimed in claim 8 including an actuator, said actuator moving said transition plates toward each other while said support handler is maintaining a stacked support stationary, said actuator moving said transition plates away from each other while said support handler is moving a stacked support.

10. The apparatus as claimed in claim 9 wherein said load stabilization system comprises two pairs of said opposing transition plates defining a quadrilateral perimeter at said opening.

11. The apparatus as claimed in claim 7 wherein said load stabilization system comprises an integrated wrapping unit operable to wrap the stacked support with a film or web.

12. The apparatus as claimed in claim 11 wherein said support handler indexes unidirectionally downwardly a support being stacked with articles.

13. The apparatus as claimed in claim 1 wherein said support handler indexes unidirectionally downwardly a support being stacked with articles.

14. The apparatus as claimed in claim 13 wherein said support handler includes an inlet for receiving empty supports and a discharge for discharging stacked supports.

15. The apparatus as claimed in claim 14 wherein said inlet and said discharge are at opposite sides of said support handler.

16. The apparatus as claimed in claim 14 wherein said support handler includes a lift for indexing a support being stacked with objects and an alignment device, said alignment device aligning empty supports with said lift.

17. The apparatus as claimed in claim 1 including a handling device to grasp objects and a travel unit that manipulates said handling device, said handling device and said travel unit being operable to displace objects to respective spatial positions to form a stacked support.

18. The apparatus as claimed in claim 17 including an object feed, said handling device and said travel unit being operable to displace objects supplied by said object feed.

19. The apparatus as claimed in claim 17 including at least two said handling devices and two said travel units, one for each said handling device, said at least two handling devices and travel units displacing objects to a common stacked support.

20. The apparatus as claimed in claim 1 wherein said placeholder is elevated above a user platform and wherein said placeholder moves downwardly toward said user platform as said placeholder changes from said first mode to said second mode.

21. A mixed article stacking apparatus for stacking objects of different sizes on a support, said apparatus comprising:
   a control operable to determine a particular order and spatial positions of the objects to be stacked on the support;
   a handling device, said handling device being responsive to said control to displace objects in the particular order to the determined spatial positions to form a stacked support;
   a support handler, said support handler manipulating a support being stacked with objects to form a stacked support, said support handler further removing a stacked support and supplying an empty support, and
   a placeholder above said support handler, said placeholder controlled by said control to change between a first mode for receiving objects from said handling device on said placeholder and a second mode for providing access to a support on said support handler, said placeholder being in said first mode while said support handler removes a stacked support and supplies an empty support, wherein objects are deposited on said placeholder by said handling device during said first mode, wherein said placeholder deposits objects that have been placed on said placeholder by said handling device during said first mode to the support when said placeholder changes from said first mode to said second mode and wherein said handling device continues to place objects on the support during said second mode to thereby complete a stacked support.

22. The apparatus as claimed in claim 21 wherein said placeholder transfers objects received thereon to an empty support supplied by said support handler.

23. The apparatus as claimed in claim 22 wherein support handler is below said placeholder and wherein said support handler removes a stacked support and supplies an empty support from below said placeholder.

24. The apparatus as claimed in claim 23 wherein said placeholder is moveable between a use position and a non-use position, said handling device displacing objects to said placeholder when said placeholder is in said use position and said placeholder depositing objects stacked thereon to a support when said placeholder moves from said use position to said non-use position.

25. The apparatus as claimed in claim 24 wherein said placeholder is used with an opening generally aligned with said support handler, said placeholder comprising at least one support surface, said at least one support surface generally covering said opening in said use position and exposing said opening in said non-use position.

26. The apparatus as claimed in claim 25 wherein said at least one support surface comprises at least two support surfaces, said at least two support surfaces moving away from each other horizontally as said placeholder changes from said use position to said non-use position.

27. The apparatus as claimed in claim 25 wherein said placeholder includes at least one stop, said at least one stop restraining objects stacked on said at least one support surface as said placeholder changes from said use position to said non-use position.

28. The apparatus as claimed in claim 27 wherein said at least one stop comprises a restraining surface, wherein said restraining surface being in a position generally aligned with said at least one support surface when said placeholder is in said non-use position and wherein said restraining surface is in a position above said at least one support surface when said placeholder changes from said use position to said non-use position.

29. The apparatus as claimed in claim 28 wherein said at least one stop rotates said restraining surface between said position generally aligned with said at least one support surface and said position above said at least one support surface.

30. The apparatus as claimed in claim 22 including a load stabilization system, said load stabilization system stabilizing a stacked support while it is being stacked with objects.

31. The apparatus as claimed in claim 30 wherein said load stabilization system comprises at least two opposing transition plates at said opening.

32. The apparatus as claimed in claim 31 including an actuator, said actuator moving said transition plates toward each other while said support handler is maintaining a stacked support stationary, said actuator moving said transition plates away from each other while said support handler is moving a stacked support.

33. The apparatus as claimed in claim 32 wherein said load stabilization system comprises two pairs of said opposing transition plates defining a quadrilateral perimeter at said opening.

34. The apparatus as claimed in claim 30 wherein said load stabilization system comprises an integrated wrapping unit operable to wrap the stacked support with a film or web.

35. The apparatus as claimed in claim 34 wherein said support handler indexes unidirectionally downwardly a support being stacked with articles.

36. The apparatus as claimed in claim 21 wherein said support handler indexes unidirectionally downwardly a support being stacked with articles.

37. The apparatus as claimed in claim 36 wherein said support handler includes an inlet for receiving empty supports and a discharge for discharging stacked supports.

38. The apparatus as claimed in claim 37 wherein said inlet and said discharge are at opposite sides of said support handler.

39. The apparatus as claimed in claim 37 wherein said support handler includes a lift for indexing a support being stacked with objects and a centering device, said centering device centering empty supports at said lift.

40. A method of multi-layer stacking objects of different sizes on a support to form a stacked support, said method comprising:
    determining a particular order and spatial positions of the objects to be stacked on the support;
    manipulating the support with a support handler and stacking objects of different sizes with a handling device on said support to form a stacked support;
    removing a stacked support and supplying an empty support with said support handler;
    operating a placeholder above said support handler in a first mode for receiving objects from a handling device on said placeholder based on the determined order and spatial positions of the objects, operating said placeholder in a second mode for providing access to a support on said support handler;
    operating said placeholder in said first mode while said support handler removes a stacked support and supplies an empty support; and
    depositing objects that have been received on said placeholder during said first mode from said placeholder to said support when changing said placeholder from said first mode to said second mode and continuing to place objects on the support with said handing device based on the determined order and spatial positions of the objects when operating said placeholder in said second mode.

41. A method of multi-layer stacking objects of different sizes on a support to form a stacked support, said method comprising:
    determining a particular order and spatial positions of the objects to be stacked on the support;
    manipulating objects with a handling device to displace objects to based on the determined order and spatial positions of the objects to form a stacked support with said handling device;
    manipulating a support with a support handler and stacking objects of different sizes with said handling device on said support to form a stacked support;
    removing a stacked support and supplying an empty support with said support handler;
    operating a placeholder above said support handler in a first mode for receiving objects with said handling device on said placeholder and a second mode for providing access to a support on said support handler by said handling device;
    putting said placeholder in said first mode while said support handler removes a stacked support and supplies an empty support; and
    depositing objects that have been received on said placeholder during said first mode from said placeholder to said support when changing said placeholder from said first mode to said second mode and continuing to place objects on the support with said handling device when operating said placeholder in said second mode.

* * * * *

UNITED STATES PATENT AND TRADEMARK OFFICE
CERTIFICATE OF CORRECTION

| | |
|---|---|
| PATENT NO. | : 8,468,781 B2 |
| APPLICATION NO. | : 12/622713 |
| DATED | : June 25, 2013 |
| INVENTOR(S) | : Rolland Fritzsche |

It is certified that error appears in the above-identified patent and that said Letters Patent is hereby corrected as shown below:

In the Specification

Column 6
Line 39, "pelletization" should be --palletization--

In the Claims

Column 10
Line 40, Claim 21, "," should be --;-- after "support"

Column 12
Line 39, Claim 41, delete "to" after "objects"

Signed and Sealed this
Thirty-first Day of December, 2013

Margaret A. Focarino
*Commissioner for Patents of the United States Patent and Trademark Office*